(12) United States Patent
Morishita

(10) Patent No.: US 11,911,699 B2
(45) Date of Patent: Feb. 27, 2024

(54) PROCESSING DEVICE HAVING SPECTATING AND MATCH INFORMATION STORAGE AND TRANSMISSION

(71) Applicant: GungHo Online Entertainment, Inc., Tokyo (JP)

(72) Inventor: Kazuki Morishita, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 36 days.

(21) Appl. No.: 17/584,465

(22) Filed: Jan. 26, 2022

(65) Prior Publication Data

US 2022/0266137 A1 Aug. 25, 2022

Related U.S. Application Data

(63) Continuation of application No. PCT/JP2021/006482, filed on Feb. 19, 2021.

(51) Int. Cl.
*A63F 13/537* (2014.01)
*A63F 13/86* (2014.01)
*A63F 13/35* (2014.01)

(52) U.S. Cl.
CPC ............ *A63F 13/537* (2014.09); *A63F 13/35* (2014.09); *A63F 13/86* (2014.09)

(58) Field of Classification Search
None
See application file for complete search history.

(56) References Cited

U.S. PATENT DOCUMENTS

| | | | |
|---|---|---|---|
| 2006/0058103 A1* | 3/2006 | Danieli | A63F 13/87 463/42 |
| 2011/0263333 A1* | 10/2011 | Dokei | A63F 13/795 463/42 |
| 2019/0270018 A1 | 9/2019 | Evans et al. | |

FOREIGN PATENT DOCUMENTS

| | | |
|---|---|---|
| JP | 2003-290557 A | 10/2003 |
| JP | 2015-008983 A | 1/2015 |
| JP | 2018-171282 A | 11/2018 |
| JP | 6783918 B1 | 11/2020 |

OTHER PUBLICATIONS

ESports World, https://esports-world.jp/column/3545, "Watching Guide for Beginners to Enjoy While Watching "RUBG"", Dec. 23, 2019, with English translation (12 Pages).

* cited by examiner

*Primary Examiner* — Damon J Pierce
(74) *Attorney, Agent, or Firm* — Harness, Dickey & Pierce, P.L.C.

(57) ABSTRACT

A processing device includes a memory and a processor. The memory is configured to store spectating information including information regarding an operation input received during execution of a game application in a first participant terminal device and match information including information regarding a result of execution of the game application based on the operation input. The processor is configured to perform processes for receiving the spectating information and the match information from the first participant terminal device via a communication interface and storing the spectating information and the match information in the memory, transmitting the spectating information to a spectator terminal device via the communication interface, and transmitting the match information to a second participant terminal device via the communication interface.

9 Claims, 15 Drawing Sheets

| USER ID | USER NAME | CHARACTER | POSSESSED CARD | ... |
|---|---|---|---|---|
| U1 | N1 | P1 | C01,C02,C03,C11... | ... |
| U2 | N2 | P2 | C21,C22,C23,C24... | ... |
| U3 | N3 | P3 | C41,C42,C43,C44... | ... |
| U4 | N3 | P4 | C51,C52,C53,C54... | ... |
| U5 | N5 | P5 | C61,C62,C63,C64... | ... |
| ... | ... | ... | ... | ... |

| unit game ID | host participant | guest participant | spectator | ... |
|---|---|---|---|---|
| G1 | U1 | U2 | U3 | ... |
| G2 | U4 | U5 | U6 | ... |
| G3 | U7 | U8 | U9 | ... |
| G4 | U10 | U11 | U12 | ... |
| G5 | U13 | U14 | U15 | ... |
| ... | ... | ... | ... | ... |

Fig. 6

| TYPE | TRANSMISSION DESTINATION | CONTENT |
|---|---|---|
| 11 | PARTICIPANT/SPECTATOR | USER ID |
| 12 | PARTICIPANT/SPECTATOR | USER ATTRIBUTE |
| 13 | PARTICIPANT/SPECTATOR | CARD MOVEMENT |
| 14 | PARTICIPANT/SPECTATOR | CARD PARAMETER CHANGE |
| 15 | PARTICIPANT/SPECTATOR | LETHAL SKILL ACTIVATION |
| ... | ... | ... |
| 111 | SPECTATOR | OPERATION LOG |
| 112 | SPECTATOR | PLAYING SITUATION INFORMATION |
| 113 | SPECTATOR | CONNECTION STATE INFORMATION |
| ... | ... | ... |

PROCESSING DEVICE HAVING SPECTATING AND MATCH INFORMATION STORAGE AND TRANSMISSION

CROSS-REFERENCE TO RELATED APPLICATIONS

The present application is a continuation application of International Application No. PCT/JP2021/006482, filed on Feb. 19, 2021, which is expressly incorporated herein by reference in its entirety.

BACKGROUND

1. Technical Field

The present disclosure relates to a processing device, a program, and a method for watching a game that is being executed in a participant terminal device.

2. Related Art

Conventionally, for a game in which one or more users participate as participants who play the game, a system having a spectating mode in which another user can spectate the ongoing game as a spectator has been known. For example, Japanese Patent Publication No. 2003-290557 A discloses a system in which when a match in which a user participates as a player ends in a game having a match game mode and a spectating mode, the user can selectively execute the spectating mode, and once the spectating mode is selected, a demonstration of the game is displayed in real time based on data received from a game device that participates in a match as a participant.

SUMMARY

Therefore, based on the above-described technology, the present disclosure provides a processing device, a program, and a method capable of providing a spectating screen that is more attractive to a spectator according to various embodiments.

Solution to Problem

According to an aspect of the present disclosure, provided is "a processing device including: a communication interface configured to be communicably connected to a first participant terminal device capable of executing a game application as a first participant, a second participant terminal device capable of executing the game application executed by the first participant terminal device as a second participant, and a spectator terminal device capable of executing the game application executed by the first participant terminal device and the second participant terminal device as a spectator via a network; a memory configured to store, in addition to a predetermined instruction command, spectating information including information regarding an operation input received during execution of the game application in the first participant terminal device and match information including information regarding a result of execution of the game application based on the operation input; and a processor configured to perform a control for receiving the spectating information and the match information from the first participant terminal device via the communication interface and storing the spectating information and the match information in the memory, transmitting the spectating information to the spectator terminal device via the communication interface, and transmitting the match information to the second participant terminal device via the communication interface, based on the predetermined instruction command".

According to an aspect of the present disclosure, provided is "a program causing a computer, which includes a communication interface configured to be communicably connected to a first participant terminal device capable of executing a game application as a first participant, a second participant terminal device capable of executing the game application executed by the first participant terminal device as a second participant, and a spectator terminal device capable of executing the game application executed by the first participant terminal device and the second participant terminal device as a spectator via a network, and a memory configured to store spectating information including information regarding an operation input received during execution of the game application in the first participant terminal device and match information including information regarding a result of execution of the game application based on the operation input, to function as a processor configured to receive the spectating information and the match information from the first participant terminal device via the communication interface and store the spectating information and the match information in the memory, to transmit the spectating information to the spectator terminal device via the communication interface, and to transmit the match information to the second participant terminal device via the communication interface".

According to an aspect of the present disclosure, provided is "a method performed by a processor executing a predetermined instruction command in a computer including a communication interface configured to be communicably connected to a first participant terminal device capable of executing a game application as a first participant, a second participant terminal device capable of executing the game application executed by the first participant terminal device as a second participant, and a spectator terminal device capable of executing the game application executed by the first participant terminal device and the second participant terminal device as a spectator via a network, and a memory configured to store, in addition to the predetermined instruction command, spectating information including information regarding an operation input received during execution of the game application in the first participant terminal device and match information including information regarding a result of execution of the game application based on the operation input, the method including: receiving the spectating information and the match information from the first participant terminal device via the communication interface and storing the spectating information and the match information in the memory; transmitting the spectating information to the spectator terminal device via the communication interface; and transmitting the match information to the second participant terminal device via the communication interface".

According to an aspect of the present disclosure, provided is "a processing device including: a communication interface configured to be communicably connected to a first participant terminal device capable of executing a game application as a first participant and a second participant terminal device capable of executing the game application executed by the first participant terminal device as a second participant via a network; a memory configured to store, in addition to a predetermined instruction command, spectating information that includes information regarding an operation input received during execution of the game application in the first participant terminal device and is different from match information including information regarding a result of execution of the game application based on the operation input; an output interface configured to output a spectating screen of the game application executed by the first participant terminal device and the second participant terminal device; and a processor configured to perform a control for receiving the spectating information via the communication interface and storing the spectating information in the memory, generating the spectating screen based on the spectating information stored in the memory, and outputting the generated spectating screen via the output interface".

According to various embodiments of the present disclosure, it is possible to provide the processing device, the program, and the method capable of providing a spectating screen that is more attractive to a spectator.

Note that the above effect is merely an example provided for convenience of description, and is not limitative. In addition to or instead of the above effect, any effect described in the present disclosure or an effect obvious to those skilled in the art can be obtained.

BRIEF DESCRIPTION OF THE DRAWINGS

FIG. 6 is a diagram illustrating an example of a configuration of information transmitted and received in the system 1 according to the embodiment of the present disclosure.

DESCRIPTION OF EXEMPLARY EMBODIMENTS

Figure 1:
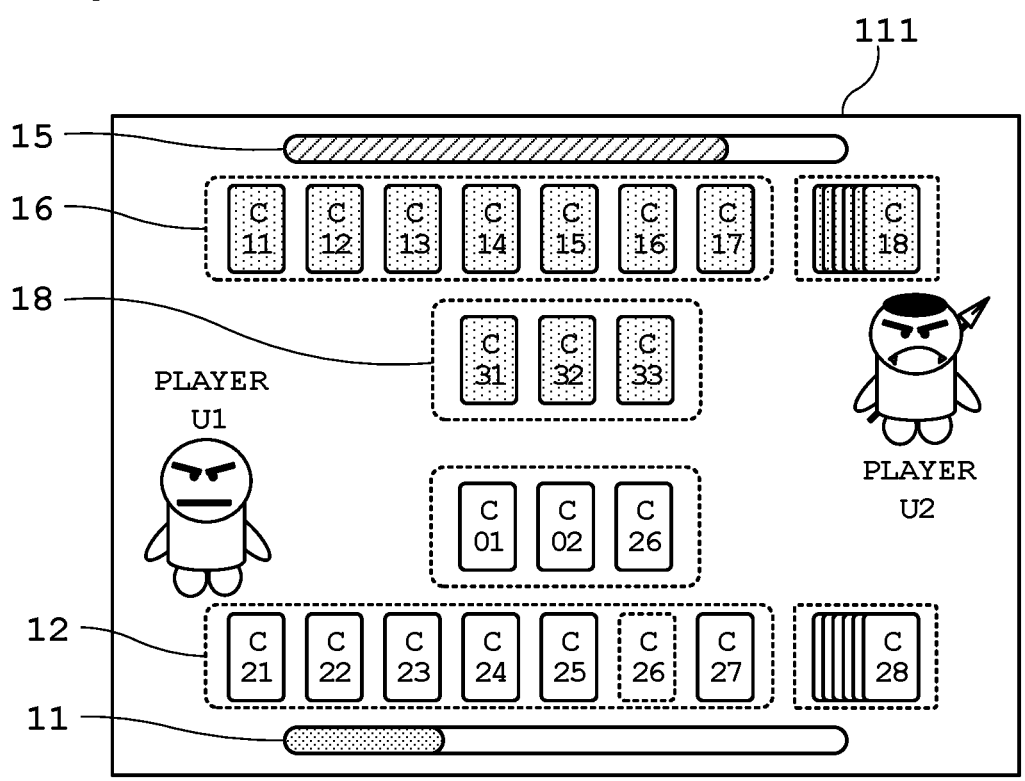
FIG. 1 is a diagram illustrating an example of a screen displayed on a spectator terminal device 100-1 according to various embodiments of the present disclosure.

Various embodiments of the present disclosure will be described with reference to the accompanying drawings. Common components in the drawings are denoted by the same reference numeral.

Outline of Application According to Present Disclosure

In a game application according to various embodiments of the present disclosure, one or more users can participate in the game as participants, and one or more other users can spectate the game as spectators.

A typical example of such a game application includes a match game application in which one or more users or computers play a match by using a virtual item object possessed thereby. More specifically, there is a card game application in which a user selects a desired card object from a plurality of card objects possessed by the user and plays a match with a user or a computer as an opponent based on parameter information set for the card object. However, the present disclosure is not limited thereto, and the system according to the present disclosure can be applied to various game applications such as a sports game, a racing game, a puzzle game, a fighting game, and a role playing game as appropriate. Note that, although not intended to be limited to a specific game application, unless otherwise specified, the outline of the system according to the present disclosure will be described by using the card game application as an example.

FIG. 1 is a diagram illustrating an example of a screen displayed on a spectator terminal device 100-1 according to various embodiments of the present disclosure. Referring to FIG. 1, a display of the spectator terminal device 100-1 displays a spectating screen of a card game application using a card item object possessed as a hand by each of a first participant (player U1) who is a host and a second participant (player U2) who is a guest. Each of a stock area 13, a play area 14, and a standby area 12 is displayed in a lower portion of a match screen, the stock area 13 being an area in which card item objects that are hands of the first participant (player U1) who is the host participant are stocked, the play area 14 being an area in which card item objects whose effect can be activated (for example, an action such as an attack on a character of the second participant (player U2) who is the guest participant is taken) according to an elapsed time are arranged, and the standby area 12 being an area in which card item objects wait to be arranged in the play area 14 according to an operation input of the first participant (player U1). Further, a hit point gauge 11 indicating a residual value of a current hit point associated with a character of the first participant is displayed. The residual value of the hit point is decreased by activation of an effect of card item objects arranged in a play area 18 of the second participant who is an opponent. On the other hand, similarly, a stock area 17, the play area 18, and a standby area 16 each in which the card objects of the second participant (player U2) who is the guest participant are arranged, and a hit point gauge 15 are also displayed in an upper portion of the match screen.

In the game application of the present disclosure, not only a result of moving a display position of the card item object or a result of activating the effect of the card item object by each participant performing the operation input on the card item object, but also the operation input itself performed by each participant on the card item object is reproduced in the spectator terminal device 100-1, such that a user who is a spectator can spectate the match. As an example thereof, referring to FIG. 1, a trajectory on which the card item object arranged in the standby area 12 is tapped and moved to the play area 14 according to the operation input performed by the first participant via an input interface of a participant terminal device 100-2, a trajectory on which the card item object is moved to the standby area 12 again in a process of being moved toward the play area 14, and the like are also reproduced. That is, it is possible to watch a state in which each participant is hesitating to select the card item object, a habit of each participant regarding an arrangement order of the card item objects in the standby area 12, and the like, and it is possible for spectator to spectate the match with a higher realistic feeling. Furthermore, since the screen displayed on the participant terminal device 100-2 or the participant terminal device 100-2 of any participant is not simply reproduced as it is, the card item object of the player U2 who is the guest participant is also displayed in an orientation appropriate for spectating (not in an orientation opposite to that of the card item object of the player U1 who is the host participant, but in the same orientation), and it is possible to facilitate spectating.

Note that, in the present disclosure, the "game" is played by execution of the game application, and includes one or more unit games (for example, one or more quests, scenarios, chapters, dungeons, missions, fightings, matches, battles, or stages) meaning one group in the game. The game may include one unit game or a plurality of unit games.

Furthermore, in the present disclosure, the terms "participant terminal device", "first participant terminal device", "second participant terminal device", "spectator terminal device", and the like merely represent expressions such as "participant", "spectator", "first participant", and "second participant" in order to distinguish each terminal device. That is, the participant terminal device can function as the spectator terminal device, and the spectator terminal device can function as the participant terminal device, the first participant terminal device, and the second participant terminal device. The first participant terminal device can function as the second participant terminal device or the spectator terminal device, and the second participant terminal device can function as the first participant terminal device or the spectator terminal device. Furthermore, the terms "participant", "first participant", "second participant", and "spectator" are merely expressions used to distinguish each user, and each user can take any position. Furthermore, each participant and a terminal device of each participant may be expressed as a "guest participant" or a "host participant", but the expression is merely an expression used to distinguish between two participants or two terminal devices. That is, there is no need to distinguish between a guest and a host in the first place, and even if there is, each participant and the terminal device of each participant can be any of them. In addition, the "user" is also be referred to as a "player" in some cases, but the term "player" means a user participating as a player in the game application, and is merely used to distinguish the user from a user participating as a spectator.

Furthermore, in the present disclosure, a processing device can be any one of a terminal device 100 such as the spectator terminal device 100-1, the participant terminal device 100-2, or a participant terminal device 100-3, or a server device 200. Processing according to each embodiment described below can be performed by either the terminal device 100 or the server device 200.

Embodiment of Present Disclosure

1. Configuration of System 1 According to Embodiment of Present Disclosure

Figure 2:
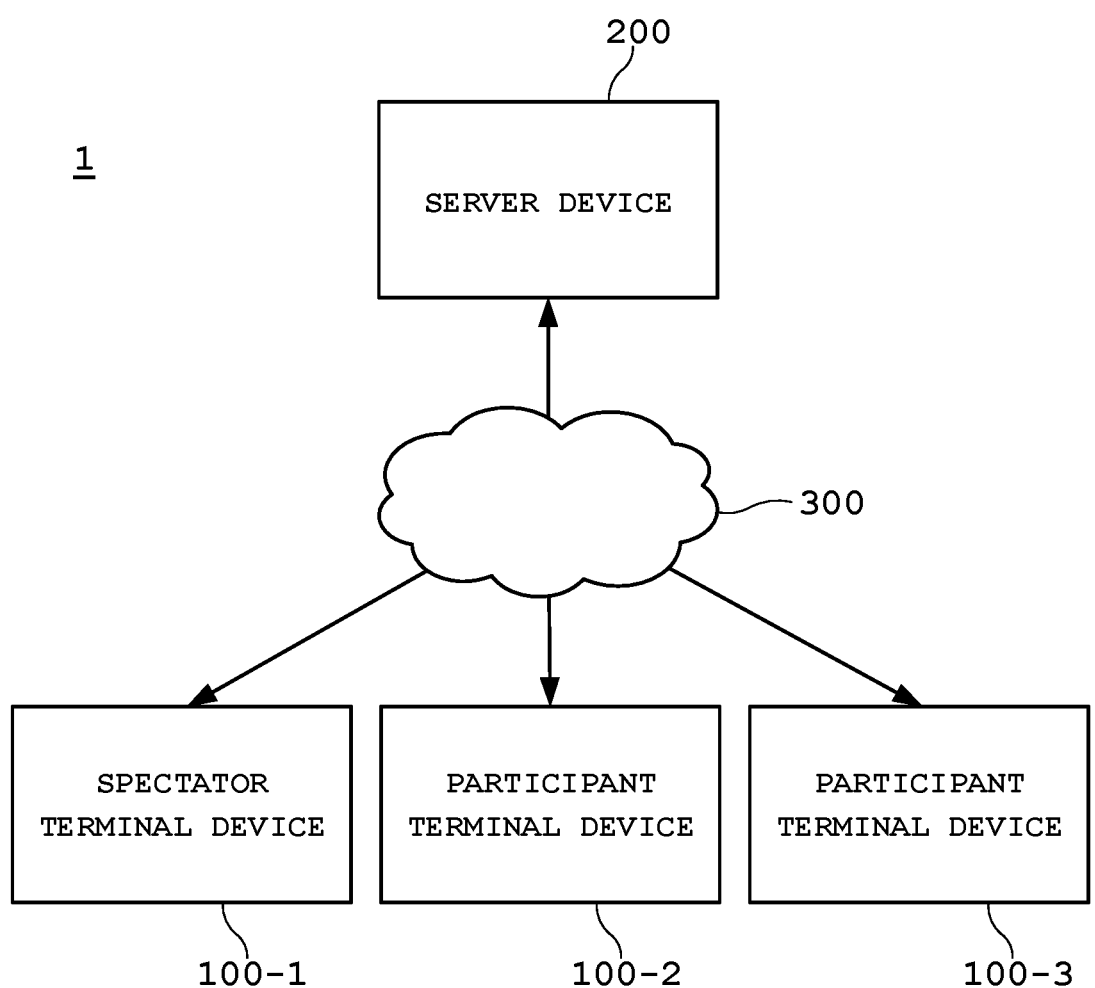
FIG. 2 is a conceptual diagram schematically illustrating a configuration of a system 1 according to an embodiment of the present disclosure.

FIG. 2 is a conceptual diagram schematically illustrating a configuration of a system 1 according to an embodiment of the present disclosure. Referring to FIG. 2, the system 1 includes the spectator terminal device 100-1 usable by a user participating as a spectator, the participant terminal device 100-2 usable by a user participating as a first participant, the participant terminal device 100-3 usable by a user participating as a second participant, and the server device 200 communicably connected through a network 300. Note that each of the terminal devices including the spectator terminal device 100-1, the participant terminal device 100-2, the participant terminal device 100-3, and the like may be referred to as the terminal device 100. In the system 1, processing of the game application according to the present embodiment is executed by the server device 200 and each terminal device 100 executing a program stored in a memory. The server device 200 and each terminal device 100 communicate with each other as needed to transmit and receive various types of information (for example, FIGS. 4A and 4B), programs, and the like necessary to progress the game application.

Note that, in the example of FIG. 2, only three terminal devices 100 are illustrated, but it is a matter of course that four or more terminal devices 100 can be included. That is, a plurality of spectator terminal devices can be included in addition to the one spectator terminal device 100-1. Similarly, a plurality of participant terminal devices can be included in addition to the two participant terminal devices, the participant terminal device 100-2 and the participant terminal device 100-3.

Furthermore, although the server device 200 is described as a single device, each component and processing of the server device 200 can be distributed to a plurality of server devices or cloud server devices. Furthermore, although the game application according to the present embodiment is executed by the system 1 including the server device 200 and the terminal device 100, the game application can also be executed only by the terminal device 100 without using the server device 200.

2. Configuration of Terminal Device 100

Figure 3A:
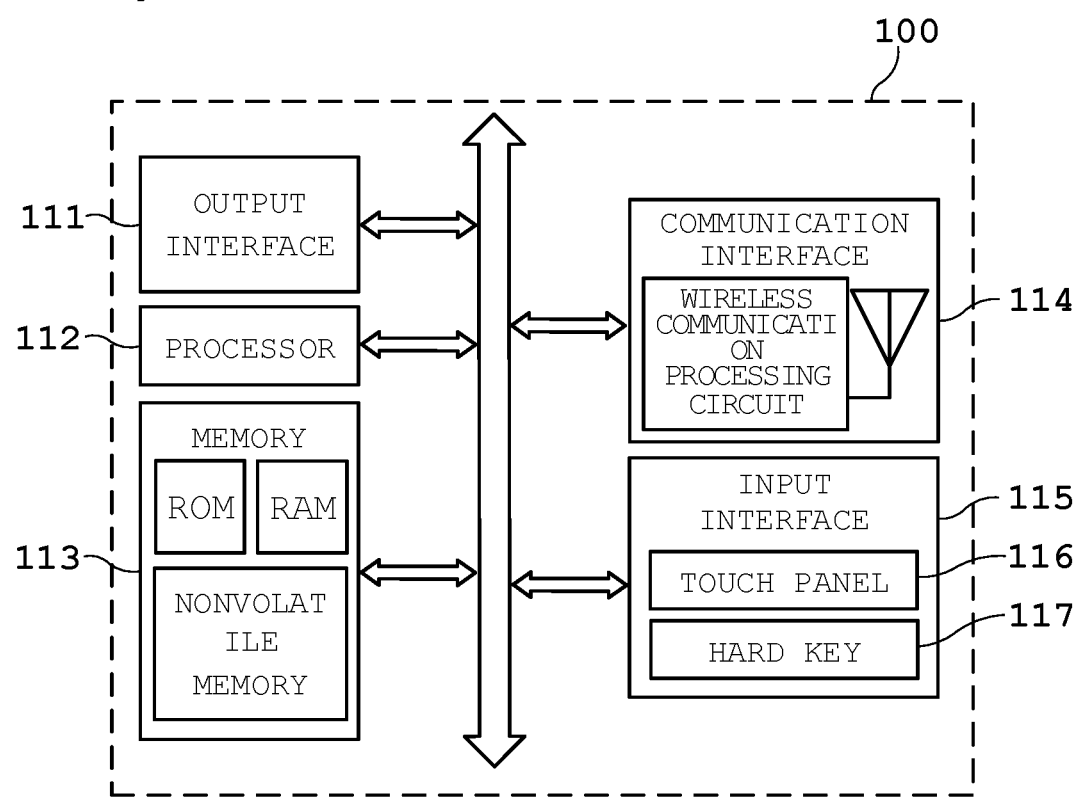
FIG. 3A is a block diagram illustrating an example of a configuration of a terminal device 100 according to the embodiment of the present disclosure. Further.

FIG. 3A is a block diagram illustrating an example of a configuration of the terminal device 100 according to the embodiment of the present disclosure. The terminal device 100 does not need to include all of the components illustrated in FIG. 3A, and can have a configuration in which a part is omitted, or another component can be added.

Examples of the terminal device 100 include a stationary game machine. However, in addition to the stationary game machine, any device capable of executing the game application according to the present disclosure, such as a portable terminal device capable of performing wireless communication typified by a smartphone, a portable game machine, a feature phone, a portable information terminal, a personal digital assistant (PDA), a laptop personal computer, or a desktop personal computer, can be suitably applied. In addition, the respective terminal devices such as the spectator terminal device 100-1, the participant terminal device 100-2, and the participant terminal device 100-3 do not need to be the same terminal devices or the same type of terminal devices. For example, the spectator terminal device 100-1 may be a stationary game machine, the participant terminal device 100-2 may be a portable game machine, and the participant terminal device 100-3 may be a smartphone.

Referring to FIG. 3A, the terminal device 100 includes an output interface 111, a processor 112, a memory 113 including a random access memory (RAM), a read only memory (ROM), a nonvolatile memory (optionally, a hard disk drive (HDD)), or the like, a communication interface 114 including a communication processing circuit and an antenna, and an input interface 115 including a touch panel 116, a hard key 117, or the like. These components are electrically connected to each other via a control line and a data line.

The processor 112 is implemented by a central processing unit (CPU) (microcomputer), and functions as a control unit that controls other connected components based on various programs stored in the memory 113. Specifically, the processor 112 reads a program for executing the game application according to the present embodiment or a program for executing an operating system (OS) from the memory 113 and executes the program. In the present embodiment, the processor 112 executes processing of receiving an operation input from the first participant and selecting a unit game in which the first participant is to participate as a host, processing of outputting a match screen for executing the selected unit game via the output interface 111, processing of receiving an operation input from the first participant during the execution of the selected unit game and performing movement, selection, determination, and the like of a game item object, processing of receiving match data from the participant terminal device 100-3 of the second participant via the communication interface 114 and storing the match data in the memory 113, processing of changing display of the match screen based on the stored match data, processing of transmitting the match data to the participant terminal device 100-3 of the second participant via the communication interface 114, processing of transmitting spectating data as a host to the spectator terminal device 100-1 via the communication interface 114, processing of receiving an operation input from the second participant for a unit game recruiting a participant as a guest and selecting participation, processing of outputting a match screen for executing a unit game in which the second participant participates as a guest via the output interface 111, processing of receiving an operation input from the second participant during the execution of the unit game in which the second participant participates as a guest and performing movement, selection, determination, and the like of a game item object, processing of receiving match data from the participant terminal device 100-2 of the first participant via the communication interface 114 and storing the match data in the memory 113, processing of changing display of the match screen based on the stored match data, processing of transmitting the match data to the participant terminal device 100-2 of the first participant via the communication interface 114, processing of transmitting spectating data as a guest to the spectator terminal device 100-1 via the communication interface 114, processing of receiving an operation input of a user and selecting a unit game in which the user is to participate as a spectator, processing of receiving spectating information regarding the selected unit game from a first participant terminal device (the participant terminal device 100-2 of the host participant), a second participant terminal device (the participant terminal device 100-3 of the guest participant), or the like via the communication interface 114 and storing the received information in the memory 113, processing of generating a spectating screen based on the spectating information stored in the memory 113, and processing of outputting the generated spectating screen via the output interface, and the like. Note that the processor 112 may be implemented by a single CPU, or may be implemented by a plurality of CPUs. In addition, another type of processor such as a graphics processing unit (GPU) specialized for image processing may be appropriately combined. Furthermore, the above-described processings do not need to be executed in all the terminal devices 100, and it is sufficient that only some of the processings are executed according to the position of the user such as a participant or a spectator.

The memory 113 includes a ROM, a RAM, a nonvolatile memory, an HDD, or the like, and functions as a storage unit. The ROM stores an instruction command for executing the game application according to the present embodiment or the OS as a program. The RAM is a memory used for writing and reading data while the program stored in the ROM is processed by the processor 112. The nonvolatile memory is a memory on which writing and reading of data are performed by execution of the program, and the data written therein is stored even after the execution of the program is completed. In the present embodiment, the memory 113 stores programs for the processing of receiving an operation input from the first participant and selecting a unit game in which the first participant is to participate as a host, the processing of outputting a match screen for executing the selected unit game via the output interface 111, the processing of receiving an operation input from the first participant during the execution of the selected unit game and performing movement, selection, determination, and the like of a game item object, the processing of receiving match data from the participant terminal device 100-3 of the second participant via the communication interface 114 and storing the match data in the memory 113, the processing of changing display of the match screen based on the stored match data, the processing of transmitting the match data to the participant terminal device 100-3 of the second participant via the communication interface 114, the processing of transmitting spectating data as a host to the spectator terminal device 100-1 via the communication interface 114, the processing of receiving an operation input from the second participant for a unit game recruiting a participant as a guest and selecting participation, the processing of outputting a match screen for executing a unit game in which the second participant participates as a guest via the output interface 111, the processing of receiving an operation input from the second participant during the execution of the unit game in which the second participant participates as a guest and performing movement, selection, determination, and the like of a game item object, the processing of receiving match data from the participant terminal device 100-2 of the first participant via the communication interface 114 and storing the match data in the memory 113, the processing of changing display of the match screen based on the stored match data, the processing of transmitting the match data to the participant terminal device 100-2 of the first participant via the communication interface 114, the processing of transmitting spectating data as a guest to the spectator terminal device 100-1 via the communication interface 114, the processing of receiving an operation input of a user and selecting a unit game in which the user is to participate as a spectator, the processing of receiving spectating information regarding the selected unit game from a first participant terminal device (the participant terminal device 100-2 of the host participant), a second participant terminal device (the participant terminal device 100-3 of the guest participant), or the like via the communication interface 114 and storing the received information in the memory 113, the processing of generating a spectating screen based on the spectating information stored in the memory 113, and the processing of outputting the generated spectating screen via the output interface, and the like. Note that, although not particularly illustrated as the memory 113, a removable storage medium, a database, or the like may be connected via the input interface 115. Furthermore, the programs for the above-described processings do not need to be stored in all the terminal devices 100, and it is sufficient that only some of the programs are stored according to the position of the user such as a participant or a spectator.

The communication interface 114 functions as a communication unit that transmits and receives information to and from the remotely installed server device 200 or another terminal device via the communication processing circuit and the antenna. The communication processing circuit executes processing for receiving a program for executing the game application according to the present embodiment, various types of information used in the game application, and the like from the server device 200 according to the progress of the game application. In addition, processing for transmitting, to the server device 200, a result of processing by the execution of the game application is executed. In the present embodiment, in particular, the spectating data and the match data are transmitted and received to and from the server device 200.

The communication processing circuit is processed based on a broadband wireless communication system represented by an LTE system, but can also be processed based on a system related to narrowband wireless communication such as a wireless LAN represented by IEEE802.11 or Bluetooth (registered trademark). Furthermore, wired communication can be used instead of or in addition to wireless communication.

The input interface 115 includes the touch panel 116 and/or the hard key 117, and receives an operation input related to the execution of the game application from the user. The touch panel 116 is disposed so as to cover the display as the output interface 111, and outputs information on position coordinates corresponding to image data displayed on the display to the processor 112. As the touch panel system, a known system such as a resistive film system, a capacitive coupling system, or an ultrasonic surface acoustic wave system can be used. In the present embodiment, as an example, the touch panel 116 detects a tap operation or a swipe operation for selection, movement, or the like of a card item object displayed on the display by an indicator. Note that the touch panel 116 is an example of an input interface, and it is a matter of course that other input interfaces can be used. It is also possible to use an input interface (a so-called controller type or keyboard type input interface) connected to a main body including the processor 112 or the like in a wireless or wired manner.

The output interface 111 functions as an output unit that reads image information stored in the memory 113 and outputs various display actions (for example, FIGS. 12 to 14) generated by execution of the game application according to the present embodiment, according to an instruction of the processor 112. Examples of the output interface 111 include a display implemented by a liquid crystal display or an organic EL display, but the terminal device 100 itself does not necessarily include a display. For example, the output interface 111 may output information for various display actions to the display connected in a wired or wireless manner.

3. Configuration of Server Device 200

Figures 3B, 4A:
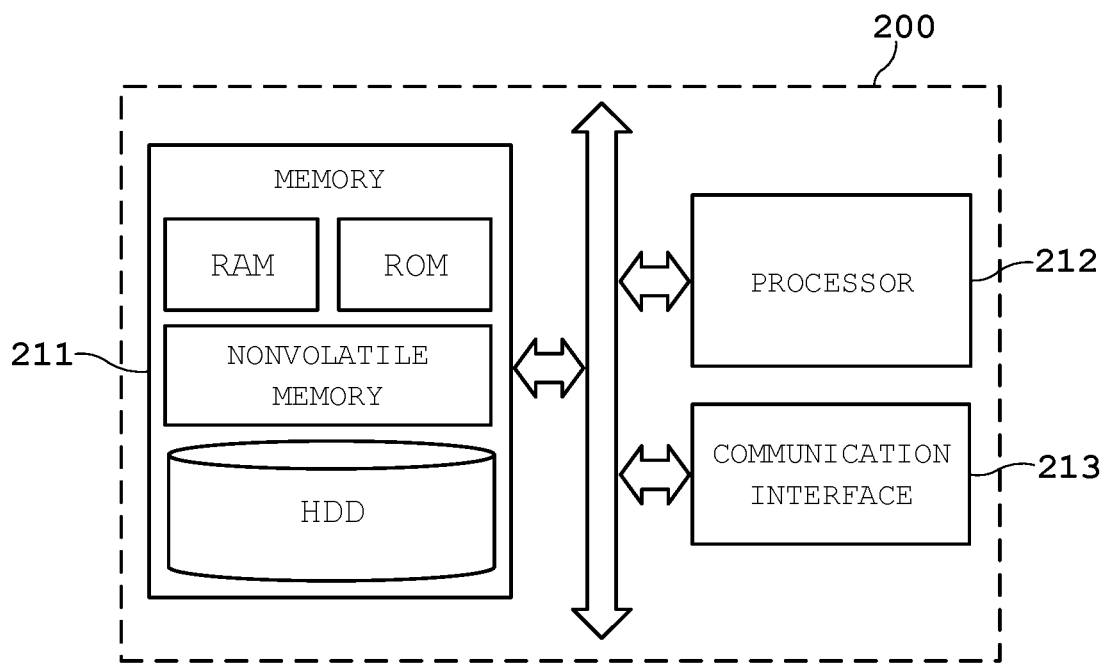
FIG. 3B is a block diagram illustrating an example of a configuration of a server device 200 according to the exemplary embodiment of the present disclosure.
FIG. 4A is a diagram conceptually illustrating a user information table stored in the server device 200 according to the embodiment of the present disclosure. Further.

FIG. 3B is a block diagram illustrating an example of a configuration of the server device 200 according to the exemplary embodiment of the present disclosure. The server device 200 does not need to include all of the components illustrated in FIG. 3B, and can have a configuration in which a part is omitted, or another component can be added.

According to FIG. 3B, the server device 200 includes a memory 211 including a RAM, a ROM, a nonvolatile memory, an HDD, and the like, a processor 212 implemented by a CPU and the like, and a communication interface 213. These components are electrically connected to each other via a control line and a data line.

The memory 211 includes a RAM, a ROM, a nonvolatile memory, and an HDD, and functions as a storage unit. The memory 211 stores an instruction command for executing the game application according to the present embodiment or the OS as a program. Such a program is loaded and executed by the processor 212. The memory 211 (particularly, the RAM) is temporarily used to write and read data while the program is executed by the processor 212. In addition to a user information table illustrated in FIG. 4A and a unit game information table illustrated in FIG. 4B, the memory 211 stores information on each item object arranged in a virtual game space formed by execution of the game application, drawing information thereof, and the like. Furthermore, the memory 211 stores programs for executing processing of receiving spectating data and match data as a host from the participant terminal device 100-2 of the first participant via the communication interface 213 and storing the received data in the memory 211, processing of transmitting the spectating data as the host to the spectator terminal device 100-1 via the communication interface 213, processing of transmitting the match data as the host to the participant terminal device 100-3 of the second participant via the communication interface 213, processing of receiving spectating data and match data as a guest from the participant terminal device 100-3 of the second participant via the communication interface 213 and storing the received data in the memory 211, processing of transmitting the spectating data as the guest to the spectator terminal device 100-1 via the communication interface 213, processing of transmitting the match data as the guest to the participant terminal device 100-2 of the first participant via the communication interface 213, and the like.

The processor 212 is implemented by a CPU (microcomputer), and functions as a control unit for controlling other connected components based on various programs stored in the memory 211. In the present embodiment, in particular, the processor 212 executes the processing of receiving spectating data and match data as a host from the participant terminal device 100-2 of the first participant via the communication interface 213 and storing the received data in the memory 211, the processing of transmitting the spectating data as the host to the spectator terminal device 100-1 via the communication interface 213, the processing of transmitting the match data as the host to the participant terminal device 100-3 of the second participant via the communication interface 213, the processing of receiving spectating data and match data as a guest from the participant terminal device 100-3 of the second participant via the communication interface 213 and storing the received data in the memory 211, the processing of transmitting the spectating data as the guest to the spectator terminal device 100-1 via the communication interface 213, the processing of transmitting the match data as the guest to the participant terminal device 100-2 of the first participant via the communication interface 213, and the like. The processor 212 may be implemented by a single CPU, or may be implemented by a plurality of CPUs.

As an example, the communication interface 213 executes processing such as modulation and demodulation in order to transmit and receive a program, various types of information, and the like for executing the game application according to the present embodiment to and from each terminal device 100 via the network 300 or to and from another server device via the network 300. The communication interface 213 communicates with each terminal device or another server device according to the above-described wireless communication system or a known wired communication system. In the present embodiment, particularly, the spectating data and the match data are transmitted and received to and from each terminal device.

4. Information Stored in Each Memory

FIG. 4A is a diagram conceptually illustrating the user information table stored in the server device 200 according to the embodiment of the present disclosure. As for information stored in the user information table, new user ID information is generated each time a user who uses the game application is newly registered, and is updated as needed according to the progress of the game application.

Referring to FIG. 4A, in the user information table, the user ID information, user name information, character information, possessed card information, and the like are stored in association with the user ID information. The "user ID information" is information specific to each user and is information for specifying each user. The user name information is information for specifying a name used by each user in the game application. The information can be arbitrarily set by each user, for example, when the game application is first executed. The character information is information for specifying a character object held by each user as an avatar in the game application. Various types of parameter information (hit points and the like) are stored in a separately stored character information table (not illustrated) in association with the character information for specifying the character object. The possessed card information is information for specifying a card item object usable by each user in the game application. Various types of parameter information (hit points, striking power, defensive power, lethal skills, and the like) are stored in a separately stored card information table (not illustrated) in association with the possessed card information for specifying the card item object. Note that, although not particularly illustrated in FIG. 4A, various types of information such as a level, stamina, and in-game currency of each user may be stored in association with each user ID information.

Figures 4B, 5:
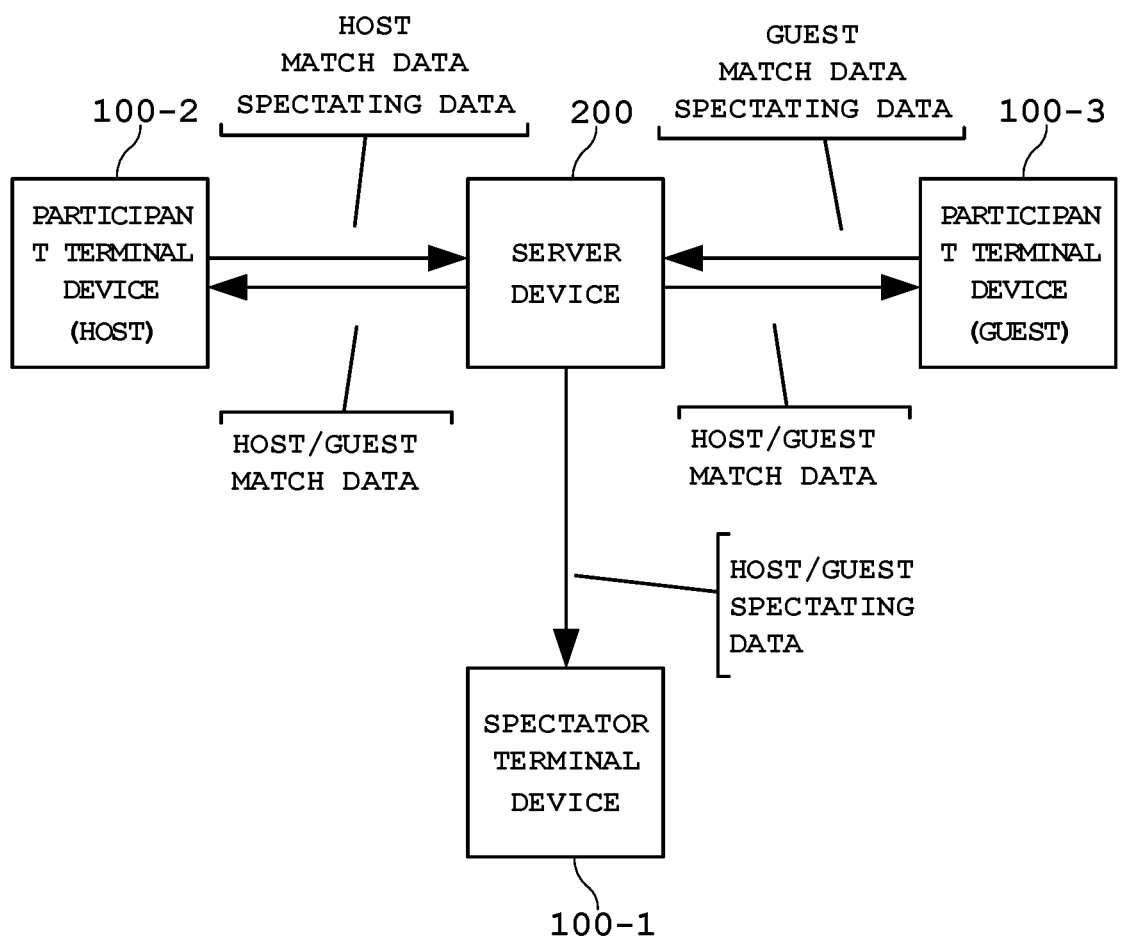
FIG. 4B is a diagram conceptually illustrating a unit game information table stored in the server device 200 according to the embodiment of the present disclosure.
FIG. 5 is a diagram illustrating an example of information transmitted and received in the system 1 according to the embodiment of the present disclosure.

FIG. 4B is a diagram conceptually illustrating the unit game information table stored in the server device 200 according to the embodiment of the present disclosure. Information stored in the unit game information table is updated as needed according to the progress of the game application.

According to FIG. 4B, in a unit game application, host participant information, guest participant information, spectator information, and the like are stored in association with a unit game ID information. The "unit game ID information" is generated each time another game is newly stored, is information unique to each unit game, and is information for specifying each unit game. Examples of such a unit game include a quest, a scenario, a chapter, a dungeon, a mission, a fighting, a match, a battle, a stage, and the like. However, the unit game may be prepared in advance, or may be newly generated by a host participant in a process of executing the game application. The "host participant information" is user ID information of a participant who is a host in each unit game. Note that the host is generally a user who has first decided to participate in the unit game. In a case where the user becomes a host participant, various settings in playing the unit game may be enabled. Specifically, the host participant may set whether or not to recruit guest participants, whether or not to solicit spectators, a match time in the game, the number of rounds in the match, and the like. The "guest participant information" is user ID information of a participant who is a guest in each unit game. For example, the guest participant makes a participation request to a unit game in which the host participant is recruiting guest participants, and once the participation request is accepted, the user ID information can be registered in the guest participant information. In a case where the user becomes a guest participant, the guest participant executes the game application as a player together with the host participant, and controls the playing of the unit game. The "spectator information" is user ID information of a user who is a spectator in each unit game. For example, the spectator makes a participation request to a unit game in which the host participant is recruiting spectators, and once the participation request is accepted, the user ID information can be registered in the spectator information. In a case where the user becomes a spectator, in a unit game that the host participant and the guest participant control to play, the spectator spectates the unit game without substantially participating in the playing, but it is also possible to participate in the playing of the unit game by a desired method such as a support, a gift, or a donation. Note that, although not particularly illustrated in FIG. 4A, various types of information such as setting of each unit game, rules, an upper limit number of guest participants, and an upper limit number of spectators may be stored in association with each unit game ID information.

5. Information Transmitted and Received Between Each Terminal Device 100 and Server Device 200

FIG. 5 is a diagram illustrating an example of information transmitted and received in the system 1 according to the embodiment of the present disclosure. Specifically, FIG. 5 is a diagram illustrating an example of information transmitted and received between the spectator terminal device 100-1, the participant terminal device 100-2 of the host participant, the participant terminal device 100-3 of the guest participant, and the server device 200 through the network 300 while the unit game is being played by execution of the game application.

First, when the unit game is executed between the participant terminal device 100-2 of the host participant and the participant terminal device 100-3 of the guest participant, the participant terminal device 100-2 or the participant terminal device 100-3 transmits the match data and the spectating data to the server device 200 at a predetermined interval or each time an operation input from the user is received by the participant terminal device 100-2 or the participant terminal device 100-3. Then, the server device 200 transmits the match data to the participant terminal device 100-3 of the guest participant who is the opponent or the participant terminal device 100-2 of the host participant, and transmits the spectating data to the spectator terminal device 100-1.

Specifically, it is as follows. First, when a predetermined time elapses or an operation input from the host participant is received by the participant terminal device 100-2, the participant terminal device 100-2 of the host participant transmits host match data and host spectating data to the server device 200. Further, when a predetermined time elapses or an operation input from the guest participant is received by the participant terminal device 100-3 of the guest participant, the participant terminal device 100-3 transmits guest match data and guest spectating data to the server device 200.

Then, the server device 200 that has received these data transmits both the host match data and the guest-host match data to the participant terminal device 100-2 of the host participant and the participant terminal device 100-3 of the guest participant who is the opponent. Each of the participant terminal device 100-2 and the participant terminal device 100-3 that have received these data executes match processing based on the received data. In addition, the server device 200 transmits the received host spectating data and guest spectating data to the spectator terminal device 100-1 of the user participating as the spectator.

Here, FIG. 6 is a diagram illustrating an example of a configuration of information transmitted and received in the system 1 according to the embodiment of the present disclosure. In the present embodiment, when a predetermined time elapses or an operation input from the host participant is received by the participant terminal device 100-2, these pieces of information are transmitted as packet data from each participant terminal device to the server device 200, and are transmitted from the server device 200 to each participant terminal device and the spectator terminal device 100-1.

Referring to FIG. 6, information that specifies the "participant" as a transmission destination is information to be transmitted as the match data. Specifically, the match data includes user ID information, user attribute information, card movement information, card parameter change information, and lethal skill activation information. The "user ID information" is information for specifying a user who holds a terminal device that is a transmission source. The "user attribute information" is information indicating whether the user participates in the unit game that is being executed as a host participant or a guest participant. The "card movement information" is coordinate information indicating a display position that is a movement destination to which the card item object is to be moved when an operation input from the participant is received by the participant terminal device. The "card parameter change information" is information indicating a parameter value after the parameter information (for example, a hit point) associated with the card item object is changed when an operation input from the participant is received by the participant terminal device. The "lethal skill activation information" is information indicating that a lethal skill is activated from the card item object when an operation input from the participant is received by the participant terminal device.

In addition, the spectating data further includes operation log information, playing situation information of each player, connection state information of each participant, and the like, in addition to the user ID information, the user attribute information, the card movement information, the card parameter change information, the lethal skill activation information, and the like. The "operation log information" is information indicating an operation input accepted by the participant terminal device of each participant. An example thereof is input information of an indicator detected by the input interface 115. Specifically, the log information is log information obtained by collecting an input key/button or position coordinates, an input duration, an operation type (tapping, long tapping, dragging, double tapping, and the like), or a combination thereof for a predetermined period. The "playing situation information" is information indicating a playing situation of the player in the unit game. As an example, the playing situation information includes standby information indicating standby such as waiting for the participation of the guest participant who is the opponent in the unit game, start information indicating that the unit game has started, execution information indicating that the unit game is being executed, and the like. The "connection state information" is a situation indicating a connection state of each participant with the network and is transmitted when each participant is disconnected from or reconnected to the network.

Note that the match data and the spectating data always do not need to be transmitted to the server device 200 at the same time, and may be transmitted at the same time or may be transmitted separately. In addition, the match data and the spectating data partially overlap each other. The overlapping part may be transmitted separately by preparing the same information for each of the match data and the spectating data, or may be transmitted simultaneously by using the same information.

Information transmitted from each participant terminal device 100 to the server device 200 and information transmitted from the server device 200 to each participant terminal device 100 and the spectator terminal device are also referred to as the match data or spectating data. However, these do not mean completely the same information. For example, information transmitted from each participant terminal device 100 to the server device 200 and information transmitted from the server device 200 to each participant terminal device 100 and the spectator terminal device may be processed or added with various types of information.

6. Processing Flow Executed in Server Device 200

Figure 7:
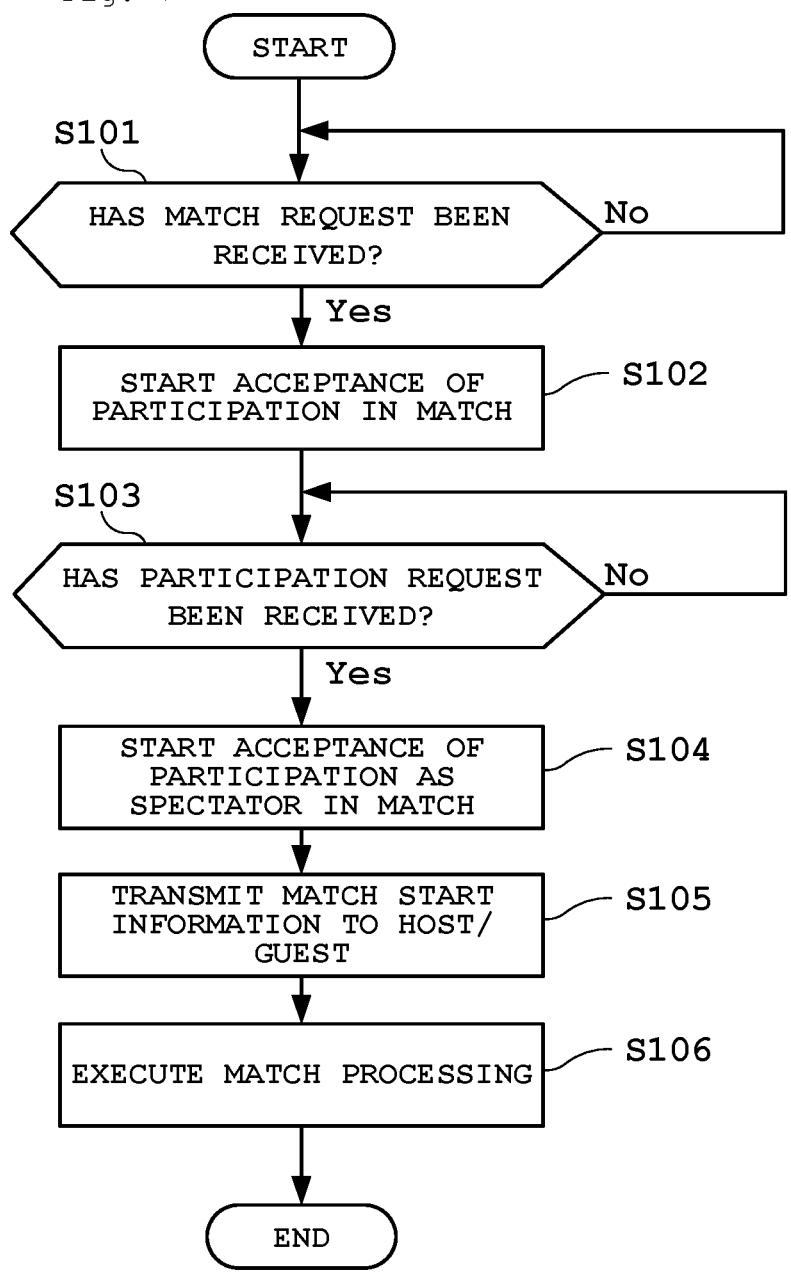
FIG. 7 is a diagram illustrating a processing flow executed in the server device 200 according to the embodiment of the present disclosure.

FIG. 7 is a diagram illustrating a processing flow executed in the server device 200 according to the embodiment of the present disclosure. Specifically, FIG. 7 illustrates a processing flow executed in the server device 200 when the game application is started in any one of the terminal devices 100 and a match of the unit game is selected.

Referring to FIG. 7, the processor 212 starts the processing flow by receiving an interrupt signal resulting from reception of a match request for the unit game from the participant terminal device 100-2 held by the host participant via the communication interface 213 (S101). Once the match request is received, the processor 212 stores the transmitted user ID information of the host participant in the host participant information of the unit game information table. Then, the processor 212 transmits information indicating that acceptance of participation as an opponent in the unit game has started, the unit game ID information of the unit game, and the user ID information of the host participant to another terminal device 100 via the communication interface 213 (S102). Note that, at this time, it is not necessary to transmit information indicating that the acceptance of the participation has started to all the terminal devices 100. For example, the information may be transmitted only to the terminal device 100 held by a specific user (for example, a user whose level is within a predetermined range) extracted based on attribute information associated with each user ID information with reference to the user information table.

Next, the processor 212 determines whether or not an interrupt signal has been received from any one terminal device 100 via the communication interface 213, the interrupt signal resulting from reception of a participation request for the unit game for which the acceptance of participation has started (S103). The participation request includes at least the user ID information of a user who desires to participate as a host and the unit game ID information that specifies a unit game in which the user desires to participate. Then, once the participation request is received, the processor 212 stores the received user ID information in the host participant information of the unit game information table based on the received unit game ID information.

Next, the processor 212 transmits information indicating that acceptance of participation as a spectator in the unit game has started, the unit game ID information of the unit game, the user ID information of the host participant, the user ID information of the guest participant, and the like to another terminal device 100 via the communication interface 213 (S104). Note that, at this time, it is not necessary to transmit information indicating that the acceptance of the participation has started to all the terminal devices 100. For example, the information may be transmitted only to the terminal device 100 held by a specific user (for example, a user whose level is within a predetermined range) extracted based on attribute information associated with each user ID information with reference to the user information table.

Thereafter, in a case where a spectating request is received, interrupt processing is executed to perform spectator registration. Specifically, the processor 212 executes spectator registration processing once an interrupt signal of the spectating request for the unit game for which the acceptance of participation has started is received from any one terminal device 100 via the communication interface 213. The spectating request includes at least the user ID information of a user who desires to spectate the unit game, and the unit game ID information that specifies the unit game that the user desires to spectate. Then, once the spectating request is received, the processor 212 stores the received user ID information in the spectator information of the unit game information table based on the received unit game ID information. Note that the acceptance of participation as a spectator can be performed at any time within a predetermined period (for example, until the match ends).

Next, the processor 212 transmits match start information to the participant terminal device 100-2 of the host participant and the participant terminal device 100-3 of the guest participant via the communication interface 213 (S105). The match start information transmitted to the participant terminal device 100-2 of the host participant includes information such as a card item object first arranged in the standby area 12 of the host participant, a card item object first arranged in the standby area 16 of the guest participant, other card item objects possessed by the host participant, and character information associated with each of the host participant and the guest participant, which are read from the user information table and the unit game information table. The match start information transmitted to the participant terminal device 100-3 of the guest participant includes information such as a card item object first arranged in the standby area 16 of the guest participant, a card item object first arranged in the standby area 12 of the host participant, other card item objects possessed by the guest participant, and character information associated with each of the guest participant and the host participant, which are read from the user information table and the unit game information table.

Note that, at this time, in a case where the user is registered in the spectator information of the unit game information table, the match start information is transmitted to the spectator terminal device 100-1 of the user associated with the registered user ID information.

Next, the processor 212 receives the match data and the like from each of the participant terminal device 100-2 of the host participant and the participant terminal device 100-3 of the guest participant, and executes match processing of the game application (S106). Then, once a hit point of a character associated with one of the participants becomes zero, the match processing ends, and the participant terminal device 100-2 and the participant terminal device 100-3 are notified of the result. Note that detailed processing executed in the match processing will be described later.

Figure 8:
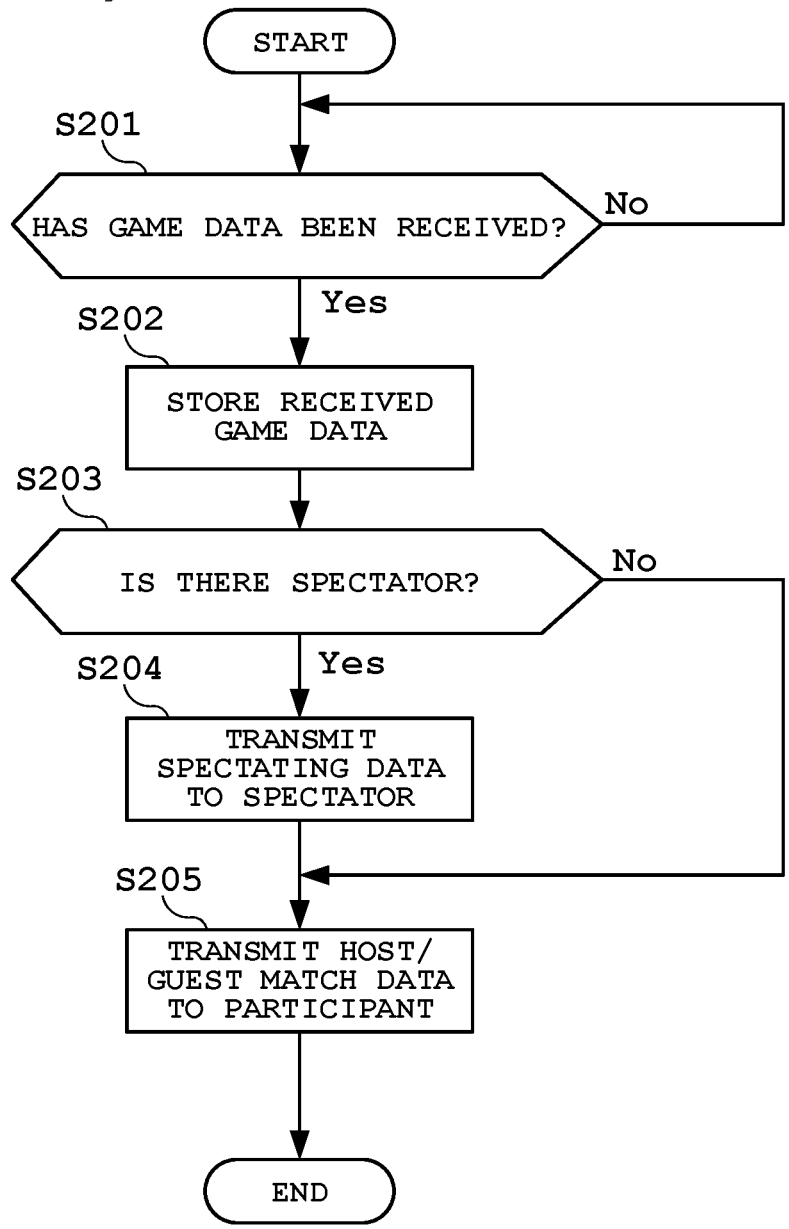
FIG. 8 is a diagram illustrating a processing flow executed in the server device 200 according to the embodiment of the present disclosure.

FIG. 8 is a diagram illustrating a processing flow executed in the server device 200 according to the embodiment of the present disclosure. Specifically, FIG. 8 illustrates a processing flow when the match processing is executed in the server device 200.

Referring to FIG. 8, the processor 212 starts the processing flow by receiving an interrupt signal resulting from reception of game data from any one of the participant terminal device 100-2 held by the host participant and the participant terminal device 100-3 held by the guest participant via the communication interface 213 (S201). Note that the game data is information including at least one of the match data or the spectating data, the unit game ID information, the user ID information of the participant terminal device that has transmitted the game data, and the like.

Once the game data is received, the processor 212 stores the received game data in the memory 211 (S202). Furthermore, in a case where the match data is included in the received game data, the processor 212 executes processing of updating the parameter information of the character object associated with the user ID information of the participant, the parameter information associated with the user ID information of the participant, and the like based on the match data.

Next, the processor 212 determines whether or not a spectator is registered by referring to the unit game information table based on the received unit game ID information (S203). Then, in a case where a spectator is registered, the processor 212 transmits the spectating data included in the received game data to the spectator terminal device 100-1 of the user corresponding to the registered user ID information via the communication interface 213 (S204). Note that, in a case where no spectator is registered, the processing is skipped.

Then, the processor 212 transmits the match data included in the game data to both the participant terminal device 100-2 of the host participant and the participant terminal device 100-3 of the guest participant via the communication interface 213 regardless of whether the transmission source is the participant terminal device 100-2 of the host participant or the participant terminal device 100-3 of the guest participant (S205). Then, the processing flow ends.

7. Processing Flow Executed in Participant Terminal Device 100-2

Figure 9:
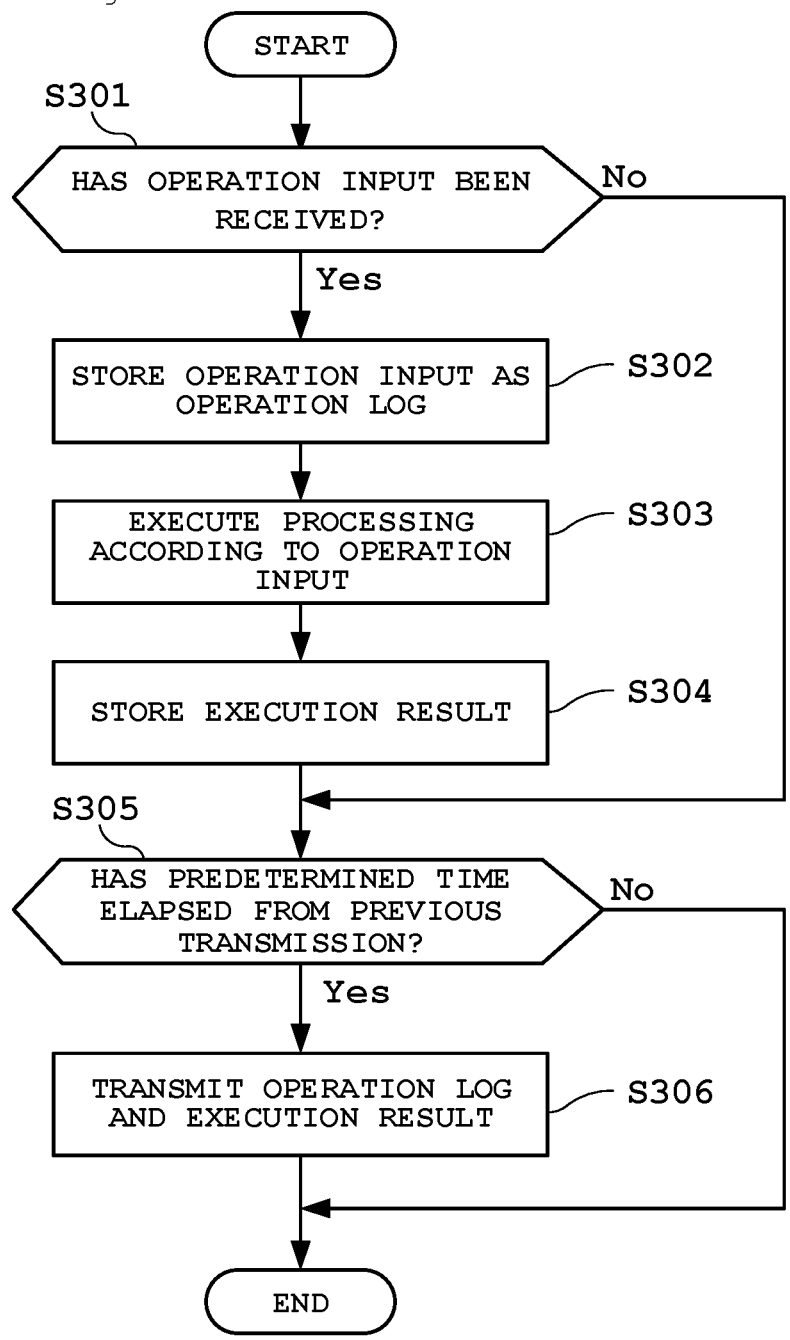
FIG. 9 is a diagram illustrating a processing flow executed in a participant terminal device 100-2 according to the embodiment of the present disclosure.

FIG. 9 is a diagram illustrating a processing flow executed in the participant terminal device 100-2 according to the embodiment of the present disclosure. Specifically, FIG. 9 illustrates a processing flow executed by the participant terminal device 100-2 when a predetermined time elapses or an operation input is detected in the input interface 115 while the match processing is being executed. Note that, in the present embodiment, a case where the match data and the spectating data are transmitted from the participant terminal device 100-2 of the host participant has been described. However, it is a matter of course that it is possible to transmit these data from the participant terminal device 100-3 of the guest participant, and in this case, similar processing is executed.

Referring to FIG. 9, the processor 112 determines whether or not an operation input from the host participant has been received in the input interface 115 of the participant terminal device 100-2 via the communication interface 114 (S301). Once the operation input is received, the processor 112 stores a content of the received operation input in the memory 113 as an operation log (corresponding to a type 111 in FIG. 6) (S302). Specifically, the processor 112 stores the input key/button or coordinate position input to the input interface 115, an input duration, an operation type (tapping, long tapping, dragging, double tapping, and the like), or a combination thereof in association with the unit game ID information and the user ID information. Then, the processor 112 executes execution processing of the game application of the unit game according to the stored operation input (S303). Examples of such execution processing include movement of the display position of the card item object and activation of a lethal skill using the card item object. Then, the processor 112 stores a result of executing the processing, such as a display position (corresponding to a type 13 in FIG. 6) of the card item object as the movement destination and the activated lethal skill (corresponding to a type 15 in FIG. 6) in the memory 113 (S304).

Next, the processor 112 determines whether or not a predetermined time has elapsed from the previous transmission of the game data by referring to a timer (not illustrated) (S305). Then, in a case where the predetermined time has elapsed, the processor 112 transmits the operation log stored in S302 and the information related to the result stored in S304 to the server device 200 as the game data together with the unit game ID information of the unit game executed in the participant terminal device 100-2, the user ID information of the user of the participant terminal device 100-2, the user attribute information, and the like. Note that the pieces of information transmitted here correspond to pieces of information illustrated in FIG. 6, respectively. Therefore, the card parameter change information, the playing situation information, the connection state information, and the like may be transmitted according to the progress of the game application.

In a case where the predetermined time has not elapsed, the processor 112 skips the processing and ends the processing flow.

Figure 12:
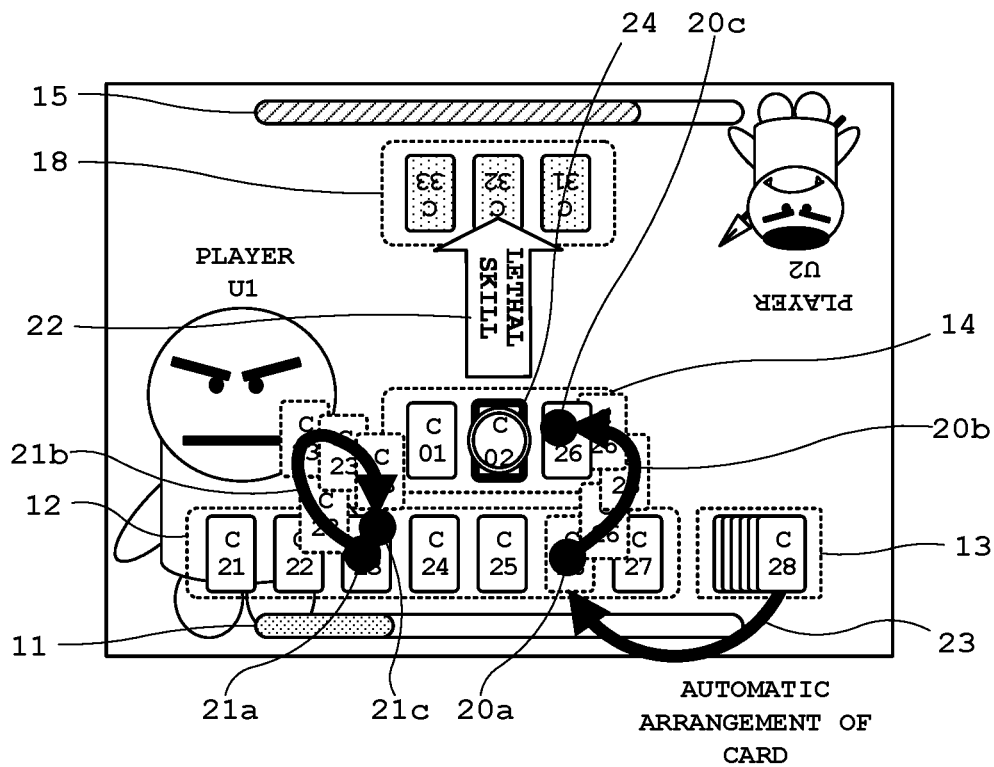
FIG. 12 is a diagram illustrating an example of a screen displayed on the participant terminal device 100-2 according to the embodiment of the present disclosure.

Here, FIG. 12 is a diagram illustrating an example of a screen displayed on the participant terminal device 100-2 according to the embodiment of the present disclosure. Specifically, FIG. 12 is a diagram illustrating an example of a match screen output to the display of the participant terminal device 100-2 during execution of the match processing of the unit game.

Referring to FIG. 12, in the match screen output to the display of the participant terminal device 100-2, a character object associated with the user ID information of the host is displayed at a lower portion of the screen. Then, the standby area 12, the play area 14, and the stock area 13 for the card item objects held by the host participant are displayed so as to at least partially overlap the character object. In addition, the hit point gauge 11 is displayed below the standby area 12 based on a parameter value (hit point) of the player character associated with the user ID information of the host participant. On the other hand, a character object associated with the user ID information of the guest participant who is the opponent is displayed at an upper portion of the screen. Further, the play area 18 of the guest participant and the hit point gauge 15 of the player character of the guest participant are displayed in the vicinity thereof. At this time, the card item object displayed in the play area 18 of the guest participant is displayed in an orientation opposite to that of the card item object displayed in the play area 18 of the host participant. In addition, the standby area and the stock area of the guest participant are not displayed, such that the host participant cannot see the standby area and the stock area. Note that the card item objects displayed in the standby area 12, the play area 14, the stock area 13, and the play area 18 are determined based on the match start information and the match data transmitted from the server device 200 in S105 of FIG. 7.

For such a match screen, a relationship between a result and an operation input when the operation input from the host participant is received via the input interface 115 will be described. In FIG. 12, respective operation inputs including a tap operation 20a of the host participant with respect to a card item object C26 displayed in the standby area 12, a drag operation 20b from a position where the tap operation 20a is performed to a position in the play area 14, and a release operation 20c at an end point (on a display position in the play area 14) of the drag operation 20b are detected via the input interface 115. Then, as a result, the card item object C26 displayed in the standby area 12 is selected by the tap operation 20a, is moved along a locus of the drag operation 20b, and is displayed to be finally arranged at the position where the release operation 20c is performed in the play area 14. In addition, since one card item object displayed in the standby area 12 disappears by this series of operation inputs, one card item object C28 is automatically moved from the stock area 13 and is displayed in the standby area 12. The card item object C28 is randomly selected from among card item objects possessed by the host participant that have not yet been displayed in the standby area 12.

In addition, in FIG. 12, respective operation inputs including a tap operation 21a of the host participant with respect to a card item object C23 displayed in the standby area 12, a drag operation 21b from a position where the tap operation 21a is performed to a position as an end point (a position on the standby area 12 where the card item object C23 is originally displayed), and a release operation 21c at the end point of the drag operation 21b are detected via the input interface 115. Then, as a result, the card item object C23 displayed in the standby area 12 is selected by the tap operation 21a, is moved along a locus of the drag operation 21b, and is displayed to be finally arranged at the position where the release operation 21c is performed in the standby area 12 again. That is, in this case, it is assumed that the host participant tries to move the card item object C23 to the play area 14 by performing the tap operation 21a and the drag operation 21b, but stops the movement halfway and performs an operation input to return the card item object C23 to the standby area 12 again.

Further, in FIG. 12, an operation input of a tap operation 24 of the host participant with respect to a card item object C02 displayed in the play area 14 is detected via the input interface 115. Then, as a result, the periphery of the card item object C02 is highlighted, and a performance 22 in which a lethal skill associated with the card item object C02 is activated for the player U2 who is the guest participant is made.

As described above, in FIG. 12, the following operation inputs are detected via the input interface 115:

Tap operation 20a, drag operation 20b, and release operation 20c;

Tap operation 21a, drag operation 21b, and release operation 21c; and

Tap operation 24.

Then, as a result of execution of the game application in the unit game based on these operation inputs, the following change processing is executed (since the card item object C23 has returned to the standby area 12 again as a result of the movement, the display position thereof is not changed):

Display position of card item object C26;

Display position of card item object C28; and

Activation of lethal skill from card item object C02.

That is, in the example of FIG. 12, from the participant terminal device 100-2 to the server device 200, coordinate information indicating the display position of the card item object C26 and coordinate information indicating the display position of the card item object C28 are transmitted as the "card movement information" included in the match data and the spectating data, and information indicating that the lethal skill has been activated from the card item object C02 is transmitted as the "lethal skill activation information". In addition, the tap operation 20a, the drag operation 20b, the release operation 20c, the tap operation 21a, the drag operation 21b, the release operation 21c, and the tap operation 24 (specifically, information such as position coordinates at which these operation inputs are made, a duration, and an operation type) are transmitted from the participant terminal device 100-2 to the server device 200 as the "operation log information" included in the spectating data.

8. Processing Flow Executed by Participant Terminal Device 100-3

Figure 10:
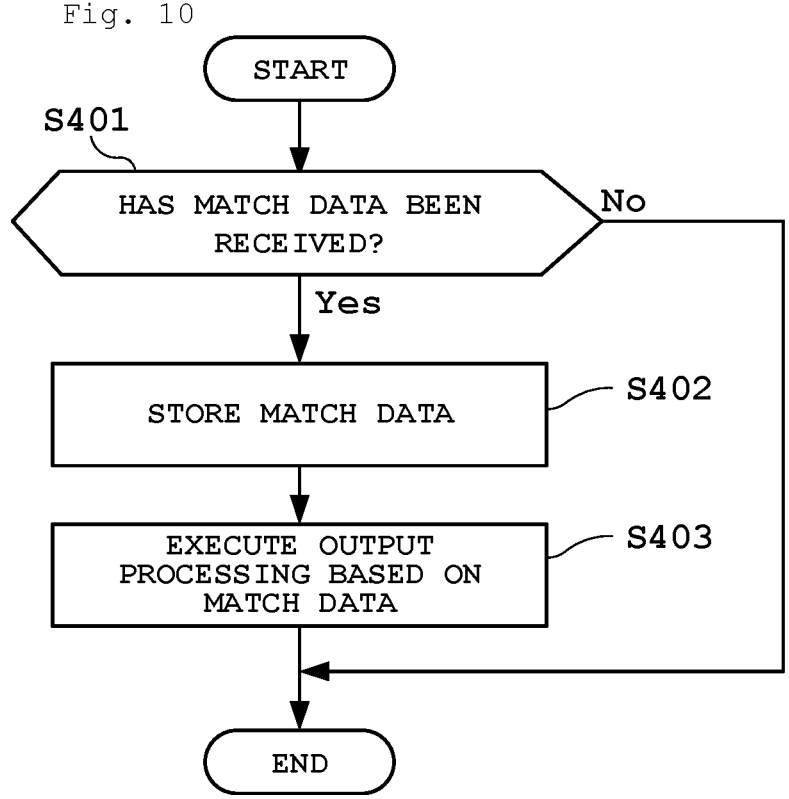
FIG. 10 is a diagram illustrating a processing flow executed in a participant terminal device 100-3 according to the embodiment of the present disclosure.

FIG. 10 is a diagram illustrating a processing flow executed in the participant terminal device 100-3 according to the embodiment of the present disclosure. Specifically, FIG. 10 illustrates a processing flow executed in the participant terminal device 100-3 when the match data is received from the server device 200. Note that, in the present embodiment, a case where the match data is received by the participant terminal device 100-3 of the guest participant has been described. However, it is a matter of course that it is possible to receive the match data by the participant terminal device 100-2 of the host participant, and in this case, similar processing is executed.

Referring to FIG. 10, the processor 112 determines whether or not the match data has been received from the server device 200 via the communication interface 114 (S401). Then, in a case where the match data has been received, the processor 112 stores the received match data in the memory 113 (S402). Then, the processor 112 generates a match screen of the guest participant based on the stored match data, and outputs the generated match screen via the output interface 111 (for example, the display) (S403).

Note that, at this time, the match data received from the server device 200 includes the card movement information, the card parameter change information, the lethal skill activation information, and the like in addition to the user ID information of the host participant as the transmission source, the user attribute information of the host participant, and the like.

Figure 13:
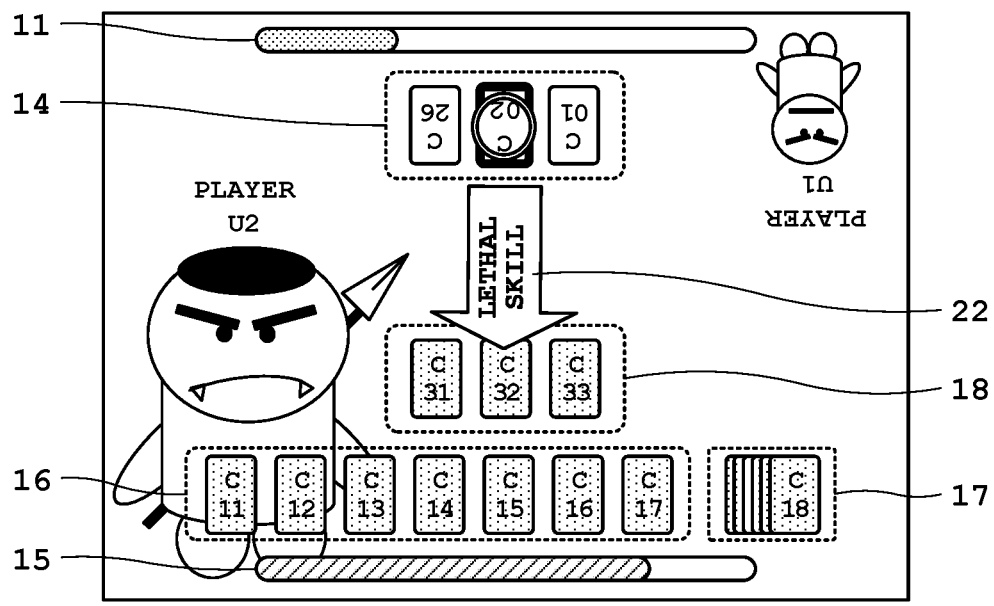
FIG. 13 is a diagram illustrating an example of a screen displayed on the participant terminal device 100-3 according to the embodiment of the present disclosure.

Here, FIG. 13 is a diagram illustrating an example of a screen displayed on the participant terminal device 100-3 according to the embodiment of the present disclosure. Specifically, FIG. 13 is a diagram illustrating an example of a match screen output to the display of the participant terminal device 100-3 during execution of the match processing of the unit game.

Referring to FIG. 13, in the match screen output to the display of the participant terminal device 100-3, a character object associated with the user ID information of the guest is displayed at a lower portion of the screen. Then, the standby area 16, the play area 18, and the stock area 17 for the card item objects held by the guest participant are displayed so as to at least partially overlap the character object. In addition, the hit point gauge 15 is displayed below the standby area 16 based on a parameter value (hit point) of the player character associated with the user ID information of the guest participant. On the other hand, a character object associated with the user ID information of the host participant who is the opponent is displayed at an upper portion of the screen. Further, the play area 14 of the host participant and the hit point gauge 11 of the player character of the host participant are displayed in the vicinity thereof. At this time, the card item object displayed in the play area 14 of the host participant is displayed in an orientation opposite to that of the card item object displayed in the play area 18 of the guest participant. In addition, the standby area and the stock area of the host participant are not displayed, such that the guest participant cannot see the standby area and the stock area. Note that the card item objects displayed in the standby area 16, the play area 18, the stock area 17, and the play area 14 are determined based on the match start information and the match data transmitted from the server device 200 in S105 of FIG. 7.

For such a match screen, a relationship between the match data received from the server device 200 and the match screen to be output will be described. Note that a case where the match data obtained by performing the operation input or the like in FIG. 12 is received will be described.

As described above, in the example of FIG. 12, from the participant terminal device 100-2 to the server device 200, the coordinate information indicating the display position of the card item object C26 and the coordinate information indicating the display position of the card item object C28 are transmitted as the "card movement information" included in the match data, and the information indicating that the lethal skill has been activated from the card item object C02 is transmitted as the "lethal skill activation information". That is, in the example of FIG. 13, the coordinate information indicating the display position of the card item object C26, the coordinate information indicating the display position of the card item object C28, and the information indicating that the lethal skill has been activated from the card item object C02 are received as the match data from the server device 200.

As a result, as illustrated in FIG. 13, on the match screen of the guest participant, the card item object C26 is displayed in the play area 14 based on the coordinate information indicating the display position of the card item object C26 among the received match data. In addition, the periphery of the card item object C02 is highlighted, and the performance 22 in which the lethal skill is activated for the player U2 who is the guest participant is made based on the information indicating that the lethal skill has been activated from the card item object C02 among the received match data. Note that the match data includes the coordinate information indicating the display position of the card item object C28. However, since the standby area of the host participant in which the card item object C28 is arranged is not displayed on the match screen of the guest participant, the output of the information is limited or ignored by the processor 112.

9. Processing Flow Executed in Spectator Terminal Device 100-1

Figure 11:
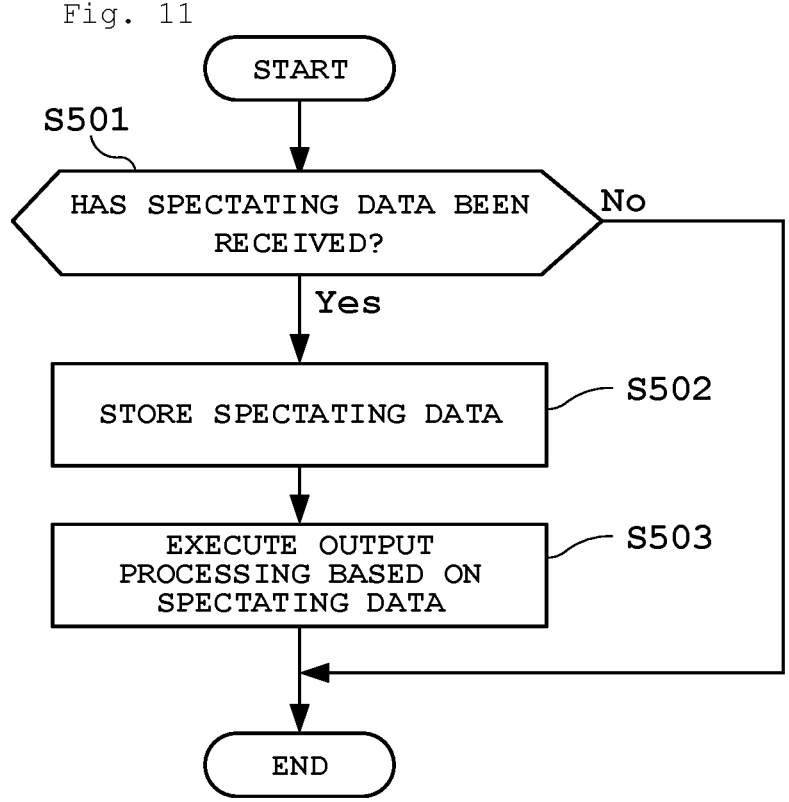
FIG. 11 is a diagram illustrating a processing flow executed in the spectator terminal device 100-1 according to the embodiment of the present disclosure.

FIG. 11 is a diagram illustrating a processing flow executed in the spectator terminal device 100-1 according to the embodiment of the present disclosure. Specifically, FIG. 11 illustrates a processing flow executed in the spectator terminal device 100-1 when the spectating data is received from the server device 200. Note that, in the present embodiment, a case where the spectating data is received from the participant terminal device 100-2 of the host participant has been described. However, it is a matter of course that it is possible to receive the spectating data from the participant terminal device 100-3 of the guest participant, and in this case, similar processing is executed.

Referring to FIG. 11, the processor 112 determines whether or not the spectating data has been received from the server device 200 via the communication interface 114 (S501). Then, in a case where the spectating data has been received, the processor 112 stores the received spectating data in the memory 113 (S502). Then, the processor 112 generates a spectating screen based on the stored spectating data, and outputs the generated spectating screen via the output interface 111 (for example, the display) (S503).

Note that, at this time, the spectating data received from the server device 200 includes the operation log information, the playing situation information, the connection state information, and the like in addition to the user ID information of the host participant as the transmission source, the user attribute information of the host participant, the card movement information, the card parameter change information, the lethal skill activation information, and the like.

Figure 14:
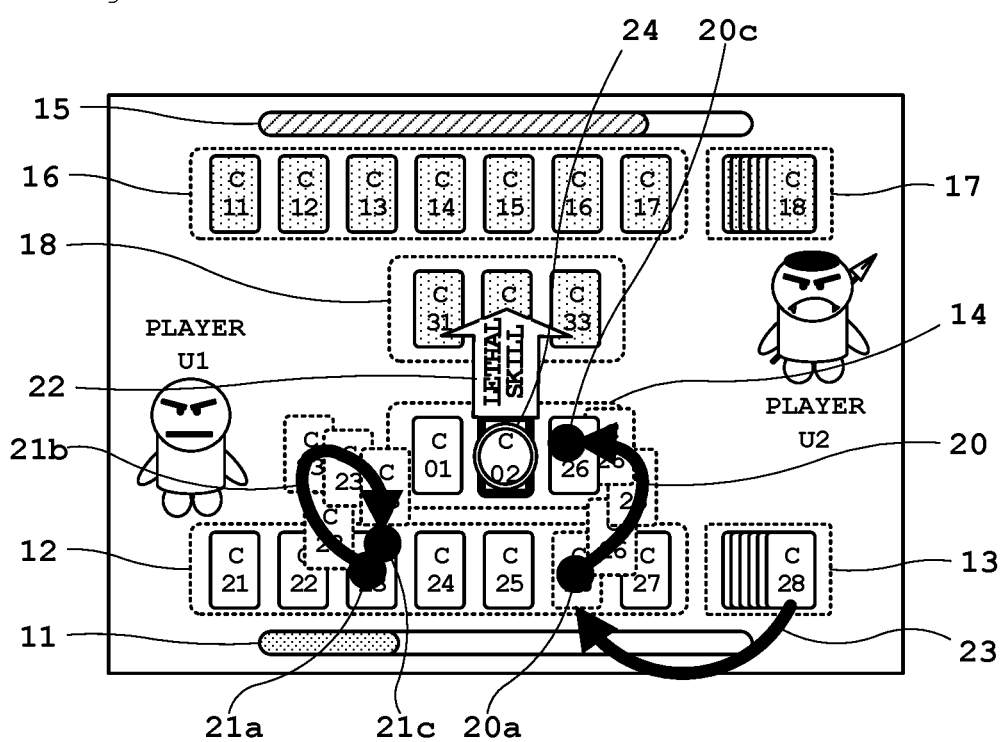
FIG. 14 is a diagram illustrating an example of a screen displayed on the spectator terminal device 100-1 according to the embodiment of the present disclosure.

Here, FIG. 14 is a diagram illustrating an example of a screen displayed on the spectator terminal device 100-1 according to the embodiment of the present disclosure. Specifically, FIG. 14 is a diagram illustrating an example of a match screen output to the display of the spectator terminal device 100-1 during execution of the match processing of the unit game.

Referring to FIG. 14, in the spectating screen output to the display of the spectator terminal device 100-1, the character object associated with the user ID information of the host participant is displayed at a lower portion of the screen. Then, each of the standby area 12, the play area 14, and the stock area 13 for the card item objects held by the host participant is displayed in the vicinity of the character object. In addition, the hit point gauge 11 is displayed below the standby area 12 based on a parameter value (hit point) of the player character associated with the user ID information of the host participant. On the other hand, the player object associated with the user ID information of the guest participant is displayed at an upper portion of the spectating screen. Then, each of the standby area 16, the play area 18, and the stock area 17 of the card item object held by the guest participant is displayed in the vicinity of the player character. In addition, the hit point gauge 15 is displayed below the standby area 16 based on a parameter value (hit point) of the player character associated with the user ID information of the guest participant. At this time, in the standby area 12, the play area 14, and the stock area 13 of the host participant, and in the standby area 16, the play area 18, and the stock area 17 of the guest participant, the card item objects possessed by the host participant and the guest participant are displayed in the same orientation. Note that each card item object displayed in each area is determined based on the match start information and the spectating data transmitted from the server device 200 in S105 of FIG. 7.

For such a spectating screen, a relationship between the spectating data received from the server device 200 and the match screen to be output will be described. Note that a case where the spectating data obtained by performing the operation input or the like in FIG. 12 is received will be described.

As described above, in the example of FIG. 12, from the participant terminal device 100-2 to the server device 200, the coordinate information indicating the display position of the card item object C26 and the coordinate information indicating the display position of the card item object C28 are transmitted as the "card movement information" included in the spectating data, the information indicating that the lethal skill has been activated from the card item object C02 is transmitted as the "lethal skill activation information", and information regarding the contents of the operation inputs including the tap operation 20a, the drag operation 20b, the release operation 20c, the tap operation 21a, the drag operation 21b, the release operation 21c, and the tap operation 24 (specifically, information such as position coordinates at which these operation inputs are made, a duration, and an operation type) is transmitted as the "operation log information". That is, in the example of FIG. 14, the "coordinate information indicating the display position of the card item object C26", the "coordinate information indicating the display position of the card item object C28", and the "information indicating that the lethal skill has been activated from the card item object C02", and the "information regarding the contents of the operation inputs including the tap operation 20a, the drag operation 20b, the release operation 20c, the tap operation 21a, the drag operation 21b, the release operation 21c, and the tap operation 24" are received as the spectating data from the server device 200.

As a result, as illustrated in FIG. 14, on the spectating screen of the spectator, the card item object C26 is displayed in the play area 14 based on the coordinate information indicating the display position of the card item object C26 among the received spectating data. Further, the card item object 28 is displayed in the standby area 12 based on the coordinate information indicating the display position of the card item object C28 among the received spectating data. In addition, the periphery of the card item object C02 is highlighted, and the performance 22 in which the lethal skill is activated for the player U2 who is the guest participant is made based on the information indicating that the lethal skill has been activated from the card item object C02 among the received spectating data.

Moreover, in the spectating screen of the spectator, display processing is executed based on, in addition to these pieces of information, the operation log information included in the received spectating data, that is, the information regarding the contents of the operation inputs including the tap operation 20a, the drag operation 20b, the release operation 20c, the tap operation 21a, the drag operation 21b, the release operation 21c, and the tap operation 24. Specifically, based on the respective operation inputs of the host participant including the tap operation 20a, the drag operation 20b, and the release operation 20c, the card item object C26 displayed in the standby area 12 is selected by the tap operation 20a, is moved along the locus of the drag operation 20b, and is finally displayed so as to be arranged at the position where the release operation 20c is performed in the play area 14. In addition, based on the respective operation inputs of the host participant including the tap operation 21a, the drag operation 21b, and the release operation 21c, the card item object C23 displayed in the standby area 12 is selected by the tap operation 21a, is moved along the locus of the drag operation 21b, and is finally displayed so as to be arranged again at the position where the release operation 21c is performed in the standby area 12.

As described above, in the spectating screen in FIG. 14, output processing by not only the result of the operation input detected by each participant terminal device 100 but also the operation input itself is executed. Therefore, as illustrated in FIG. 14, it is possible to reproduce a more realistic screen such as a state in which the host participant selects the card item object C26 and moves the card item object C26 to the play area 14, and a state in which the card item object C23 is returned to the standby area 12 again although the host participant has tried to select and arrange the card item object C23 in the play area 14 once.

Furthermore, the spectating screen in FIG. 14 is not simply generated based on drawing data of the match screen output from either the participant terminal device 100-2 of the host participant or the participant terminal device 100-3 of the guest participant after receiving the drawing data. That is, the screen of the unit game that is being executed is reproduced as the spectating screen based on the received spectating data. Therefore, each card item object of the host participant, the card item object of the guest participant, and the like are not displayed in opposite orientations, but are displayed in the same orientation. Therefore, it is possible to display any operation input or item object of any participant in an optimum form for watching, and it is possible to improve comfort for the spectator.

As described above, in the present embodiment, it is possible to provide the processing device, the program, and the method capable of providing the spectating screen that is more attractive to a spectator.

Other Embodiments

In the above-described embodiment, a case where the server device 200 is used as the processing device and the processor 212 executes various processings according to FIGS. 7 and 8 has been described. However, the present disclosure is not limited thereto. The terminal device 100 can also be used as the processing device, and the processor 112 can execute various processings according to FIGS. 7 and 8. In this case, the terminal device may be directly connected to another terminal device 100 via the communication interface 114, or may be connected to another terminal device 100 via the server device. Furthermore, the memory 113 of the terminal device 100 functioning as a processing device may store the user information table and the unit game information table illustrated in FIGS. 4A and 4B.

In such a case, the participant terminal device 100-2 executes each of processing related to the reception of the match request illustrated in FIGS. 7 and 8, processing related to the acceptance of participation as the guest participant, processing related to the acceptance of participation as the spectator in the match, processing of transmitting the match start information to the participant terminal device 100-3 of the guest participant, processing of receiving the game data from the guest participant, processing of transmitting the spectating data of the host participant and the guest participant to the spectator in a case where there is a spectator, and processing of transmitting the host match data to the guest participant.

Figure 15:
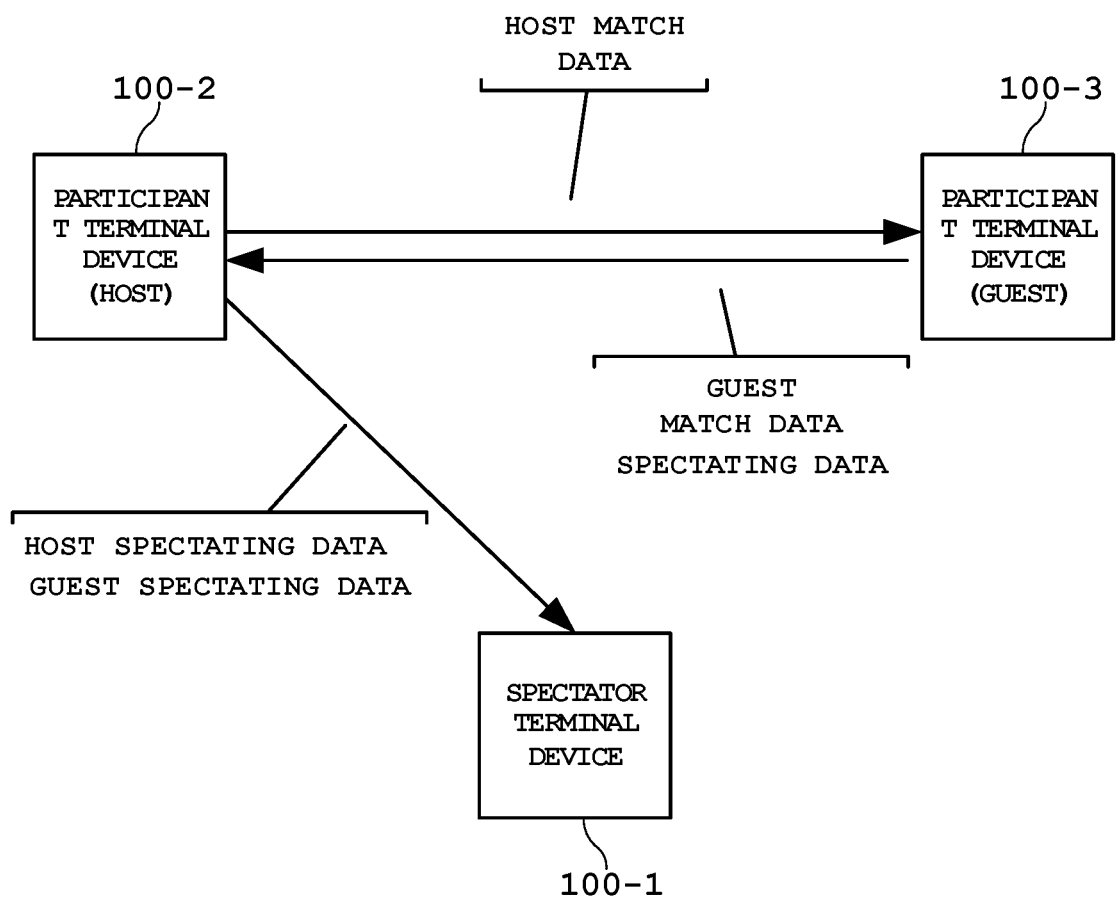
FIG. 15 is a diagram illustrating an example of information transmitted and received in the system 1 according to the embodiment of the present disclosure.

FIG. 15 is a diagram illustrating an example of information transmitted and received in the system 1 according to the embodiment of the present disclosure. Specifically, FIG. 15 illustrates an example of information transmitted and received in a case where the participant terminal device 100-2 of the host participant functions as the processing device. Referring to FIG. 15, the participant terminal device 100-2 of the host participant transmits the match data of the host participant to the participant terminal device 100-3 of the guest participant. At this time, since the guest participant does not need the spectating data of the host participant, the spectating data is not transmitted to the participant terminal device 100-3 of the guest participant. On the other hand, the participant terminal device 100-2 of the host participant receives the match data and the spectating data of the guest participant from the participant terminal device 100-3 of the guest participant as the game data. Then, the participant terminal device 100-2 of the host participant also transmits the received spectating data of the guest participant to the spectator terminal device 100-1 of the spectator in addition to the spectating data of the host participant. Note that the spectating data of the guest participant can also be directly transmitted from the participant terminal device 100-3 of the guest participant to the spectator terminal device 100-1 without passing through the participant terminal device 100-2 of the host participant.

In addition, in the above-described embodiment, a case where the input key/button or coordinate position, an input duration, an operation type (tapping, long tapping, dragging, double tapping, and the like), or a combination thereof is stored as the operation log information included in the spectating data, and the spectating screen is reproduced based on these pieces of information has been described. However, the present disclosure is not limited thereto, and information regarding the time or order at or in which each operation input is detected may be further stored as the operation log information. That is, in the example of FIG. 12, the tap operation 20a, the drag operation 20b, the release operation 20c, the tap operation 21a, the drag operation 21b, the release operation 21c, the tap operation 24, and the like are detected via the input interface 115. At this time, when the information regarding the time or order at or in which each operation input is detected is added, for example, it is possible to specify that the tap operation 21a is detected first, and then the drag operation 21b, the release operation 21c, the tap operation 20a, the drag operation 20b, the release operation 20c, and the tap operation 24 are detected in this order.

Figure 16:
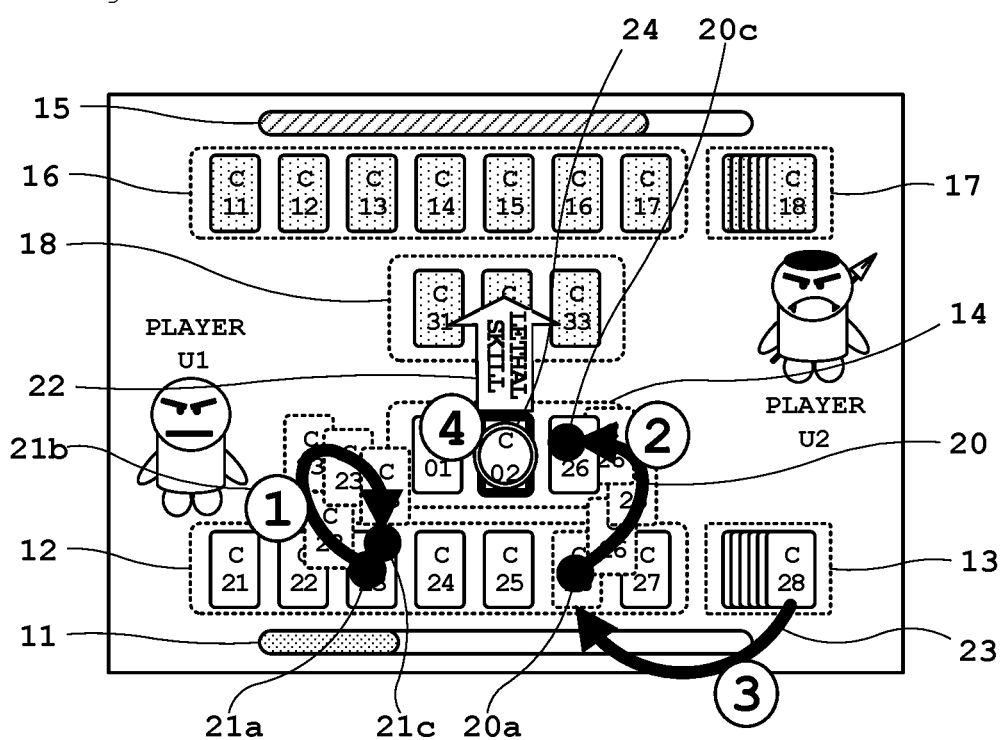
FIG. 16 is a diagram illustrating an example of a screen displayed on the spectator terminal device 100-1 according to the embodiment of the present disclosure.

FIG. 16 is a diagram illustrating an example of a screen displayed on the spectator terminal device 100-1 according to the embodiment of the present disclosure. Specifically, FIG. 16 illustrates an example of the spectating screen in a case where the information regarding the time or order at or in which each operation input is detected is further received as the operation log information included in the spectating data. Referring to FIG. 16, the operation inputs are reproduced in this order of the tap operation 21a, the drag operation 21b, and the release operation 21c based on the information regarding the time or order of each operation input, and a state in which the card item object C23 is selected and moved toward the play area 18 once, but the card item object C23 is returned to the standby area 12 again is displayed on the spectating screen. Next, the operation inputs are reproduced in this order of the tap operation 20a, the drag operation 20b, and the release operation 20c, and the card item object C26 is selected, moved toward the play area 18, and arranged in the play area 18. Further, a state in which the card item object C28 is moved from the stock area 13 to the standby area 12 is displayed on the spectating screen. Next, the tap operation 24 as the operation input is reproduced, and a state in which the card item object C02 is selected and the lethal skill is activated is displayed on the spectating screen.

In this manner, by using the information regarding the time or order at or in which each operation input is detected as the spectating data, it is possible to more faithfully reproduce a state in which the participant hesitates to select or move the card item object.

It is also possible to configure the system by appropriately combining or replacing each element described in each embodiment.

The processing and procedures described in the present specification can be implemented not only by those explicitly described in the embodiments but also by software, hardware, or a combination thereof. Specifically, the processing and procedures described in the present specification are implemented by implementing logic corresponding to the processing in a medium such as an integrated circuit, a volatile memory, a nonvolatile memory, a magnetic disk, or an optical storage. In addition, the processing and procedures described in the present specification can be implemented as a computer program and executed by various computers including a terminal device and a server device.

Even though it is described that the processing and procedures described in the present specification are executed by a single device, single software, a single component, or a single module, such processing or procedures can be executed by a plurality of devices, a plurality of pieces of software, a plurality of components, and/or a plurality of modules. Furthermore, even though it is described that various types of information described in the present specification are stored in a single memory or storage unit, such information can be stored in a distributed manner in a plurality of memories provided in a single device or a plurality of memories arranged in a distributed manner in a plurality of devices. Furthermore, the components of the software and the hardware described in the present specification can be implemented by integrating them into fewer components or decomposing them into more components.

The processing device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A processing device comprising:
    a communication interface configured to be communicably connected to a first participant terminal device configured to execute a game application as a first participant, a second participant terminal device configured to execute the game application executed by the first participant terminal device as a second participant, and a spectator terminal device configured to execute the game application executed by the first participant terminal device and the second participant terminal device as a spectator via a network;
    a memory configured to store:
        computer readable instructions;
        spectating information including operation log information regarding a series of operation inputs with respect to an object received during execution of the game application in the first participant terminal device, the object being configured to be operated via the series of operation inputs by the first participant, the operation loci information being configured to be used in the spectator terminal device to reproduce an event that has occurred due to the series of operation inputs by the first participant with respect to the object; and
        match information including display position information regarding a display position of the object, the display position corresponding to an operation result state after the game application has been executed based on the series of operation inputs and the object has been operated via the series of operation inputs by the first participant; and
    a processor configured to execute the computer readable instructions so as to:
        receive the spectating information and the match information from the first participant terminal device via the communication interface during the execution of the game application in the first participant terminal device and store the spectating information and the match information in the memory;
        transmit the spectating information to the spectator terminal device via the communication interface during execution of the game application in the spectator terminal device; and
        transmit the match information to the second participant terminal device via the communication interface during execution of the game application in the second participant terminal device.

2. The processing device according to claim 1, wherein the spectating information further includes the display position information regarding the display position of the object.

3. The processing device according to claim 1, wherein the operation log information regarding the series of operation inputs included in the spectating information includes a content of an instruction input from the first participant detected by an input interface of the first participant terminal device.

4. The processing device according to claim 3, wherein the object includes an item object, and the instruction input relates to the item object displayed during execution of the game application.

5. The processing device according to claim 4, wherein the instruction input relates to movement of the display position of the item object.

6. The processing device according to claim 5, wherein the display position information regarding the display position of the object relates to a display position after the item object has been moved by the series of operation inputs.

7. A computer program product embodying computer readable instructions stored on a non-transitory computer-readable storage medium for causing a computer including a communication interface configured to be communicably connected to a first participant terminal device configured to execute a game application as a first participant, a second participant terminal device configured to execute the game application executed by the first participant terminal device as a second participant, and a spectator terminal device configured to execute the game application executed by the first participant terminal device and the second participant terminal device as a spectator via a network, and a memory configured to store:
    spectating information including operation log information regarding a series of operation inputs with respect to an object received during execution of the game application in the first participant terminal device, the object being configured to be operated via the series of operation inputs by the first participant, the operation loci information being configured to be used in the spectator terminal device to reproduce an event that has occurred due to the series of operation inputs by the first participant with respect to the object; and match information including display position information regarding a display position of the object, the display position corresponding to an operation result state after the game application has been executed based on the series of operation inputs and the object has been operated via the series of operation inputs by the first participant, to execute a process by a processor so as to perform the steps of:

receiving the spectating information and the match information from the first participant terminal device via the communication interface during the execution of the game application in the first participant terminal device and storing the spectating information and the match information in the memory;

transmitting the spectating information to the spectator terminal device via the communication interface during execution of the game application in the spectator terminal device; and transmitting the match information to the second participant terminal device via the communication interface during execution of the game application in the second participant terminal device.

8. A method performed for causing a processor in a computer to execute a process, the computer including a communication interface configured to be communicably connected to a first participant terminal device configured to execute a game application as a first participant, a second participant terminal device configured to execute the game application executed by the first participant terminal device as a second participant, and a spectator terminal device configured to execute the game application executed by the first participant terminal device and the second participant terminal device as a spectator via a network, and a memory configured to store:

computer readable instructions;

spectating information including operation log information regarding a series of operation inputs with respect to an object received during execution of the game application in the first participant terminal device, the object being configured to be operated via the series of operation inputs by the first participant, the operation loci information being configured to be used in the spectator terminal device to reproduce an event that has occurred due to the series of operation inputs by the first participant with respect to the object; and match information including display position information regarding a display position of the object, the display position corresponding to an operation result state after the game application has been executed based on the series of operation inputs and the object has been operated via the series of operation inputs by the first participant, the method comprising executing the computer readable instructions on the processor the steps of:

receiving the spectating information and the match information from the first participant terminal device via the communication interface during the execution of the game application in the first participant terminal device and storing the spectating information and the match information in the memory;

transmitting the spectating information to the spectator terminal device via the communication interface during execution of the game application in the spectator terminal device; and transmitting the match information to the second participant terminal device via the communication interface during execution of the game application in the second participant terminal device.

9. A processing device comprising:

a communication interface configured to be communicably connected to a first participant terminal device configured to execute a game application as a first participant and a second participant terminal device configured to execute the game application executed by the first participant terminal device as a second participant via a network;

a memory configured to store:

computer readable instructions; and spectating information including operation log information regarding a series of operation inputs with respect to an object received during execution of the game application in the first participant terminal device, the object being configured to be operated via the series of operation inputs by the first participant, the operation loci information being configured to be used in the spectator terminal device to reproduce an event that has occurred due to the series of operation inputs by the first participant with respect to the object, wherein the spectating information is different from match information including display position information regarding a display position of the object, the display position corresponding to an operation result state after the game application has been executed based on the series of operation inputs and the object has been operated via the series of operation inputs by the first participant;

an output interface configured to output a spectating screen of the game application executed by the first participant terminal device and the second participant terminal device; and a processor configured to execute the computer readable instructions so as to:

receive the spectating information via the communication interface and store the spectating information in the memory;

generate the spectating screen based on the spectating information stored in the memory; and output the generated spectating screen via the output interface.

* * * * *